(12) United States Patent
Mohri et al.

(10) Patent No.: US 6,309,708 B1
(45) Date of Patent: *Oct. 30, 2001

(54) STAIN-PROOFING AGENT FOR PREVENTING ADHERENCE OF STAIN AND COMPOSITION FOR PAINTS

(75) Inventors: Haruhiko Mohri; Yasushi Yonei, both of Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,454
(22) PCT Filed: Sep. 4, 1996
(86) PCT No.: PCT/JP96/02521
  § 371 Date: Mar. 23, 1998
  § 102(e) Date: Mar. 23, 1998
(87) PCT Pub. No.: WO97/11130
  PCT Pub. Date: Mar. 27, 1997

(30) Foreign Application Priority Data

Sep. 22, 1995 (JP) .................................... 7-244482
Mar. 25, 1996 (JP) .................................... 8-068011

(51) Int. Cl.[7] .............................. B05D 3/02; B05D 3/00; C08K 5/5415; C08K 5/56
(52) U.S. Cl. ................ 427/387; 427/385.5; 524/175; 524/176; 524/262; 524/263; 524/264; 524/463
(58) Field of Search ..................... 524/175, 176, 524/262, 263, 264, 395, 463; 427/385.5, 387

(56) References Cited

U.S. PATENT DOCUMENTS

| | | | |
|---|---|---|---|
| 3,367,910 | * | 2/1968 | Newing, Jr. .................. 524/175 |
| 3,754,989 | * | 8/1973 | Bockstie, Jr. ................ 428/331 |
| 3,813,351 | * | 5/1974 | Thomson ..................... 524/263 |
| 4,292,236 | * | 9/1981 | Ibsen et al. .................. 524/264 |
| 4,715,968 | * | 12/1987 | Sugerman et al. ............ 524/176 |
| 4,722,951 | | 2/1988 | Yoshioka et al. ............. 523/456 |
| 4,908,323 | * | 3/1990 | Werner ........................ 436/135 |
| 5,349,004 | * | 9/1994 | Kumar et al. ................. 524/263 |
| 5,432,218 | * | 7/1995 | Mikami et al. ............... 524/262 |
| 5,447,987 | * | 9/1995 | Sato et al. .................... 524/263 |
| 5,786,412 | * | 7/1998 | Shah et al. ................... 524/264 |
| 5,874,596 | * | 2/1999 | Onozawa et al. ............. 549/531 |

FOREIGN PATENT DOCUMENTS

| | | |
|---|---|---|
| 61-221282A | 10/1986 | (JP) . |
| 1121374 * | 5/1989 | (JP) . |
| 5-51560A * | 3/1993 | (JP) . |
| 5-163482A * | 6/1993 | (JP) . |
| 6-182290A | 7/1994 | (JP) . |
| 8-60072A | 3/1996 | (JP) . |

* cited by examiner

*Primary Examiner*—Tae H. Yoon

(57) ABSTRACT

A paint composition being capable of forming a coating film which is remarkably excellent in stain-proofing property whereby neither stains in the air nor stains marked due to rain water adhere to or are deposited on the coating film surface and a stain-proofing agent for adding to the composition are provided. The paint composition comprises a stain-proofing agent comprising an organometallic compound represented by $X_bM(OR^1)_aR^2_c$, its oligomer or cooligomer comprising two or more of the organometallic compounds; a resin for paints; and a curing agent and/or a curing catalyst, provided that a stain-proofing agent comprising a compound represented by the formula (2):

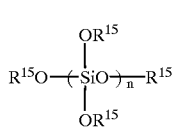

(2)

is excluded.

2 Claims, No Drawings

STAIN-PROOFING AGENT FOR PREVENTING ADHERENCE OF STAIN AND COMPOSITION FOR PAINTS

TECHNICAL FIELD

The present invention relates to a stain-proofing agent for preventing adherence of stains and a composition for paints, and particularly relates to the composition suitable for paints for building materials, civil engineering, heavy duty coating, automobiles, etc. and the stain-proofing agent to be added to the composition.

BACKGROUND ART

In recent years, a solvent-soluble fluoroolefin copolymer containing hydroxyl group or carboxyl group has been used as an ultra-high weather resistive coating resin, and the use thereof has been increasing. It is known that copolymers of fluoroolefin with vinyl ether, vinyl ester or the like, which are proposed in, for example, JP-B-60-21686, JP-A-3-121107, JP-A-4-279612 and JP-A-4-28707, are soluble in usual solvent for paints, and in combination use with a curing agent such as isocyanate or melamine, can be baked or cured at normal temperature to form coating films excellent in weather resistance.

However, those coating films have a problem that, when the films are exposed outdoors, stains in the air and in the rain water are easy to adhere to and deposit on a surface of the coating film (problem in stain-proofing property for preventing adherence of stains). In order to improve wipe-off property of carbon stains and marking ink (stain removable property), reaction products of fluoroolefin copolymer and silane compound were investigated in, for example, JP-A-4-173881. Also in U.S. Pat. No. 3,429,845 and JP-A-4-275379, there are proposed compositions of hydroxyl group-containing fluoroolefin copolymers and a hydrolysis product prepared by adding water and a catalyst (hydrochloric acid, etc.) to a silicate (monomer) or a silicate condensate (oligomer) and then hydrolyzing the mixture in alcohol. However, those compositions cannot offer the effect of improving the above-mentioned stain-proofing property.

Examples of employing a silane compound as a curing moiety as mentioned above are also proposed in JP-B-45-11309, JP-A-5-78612, JP-A-61-258852, JP-A-62-116673, JP-A-64-75575, JP-A-2-232221, JP-A-2-240153, JP-A-4-211482, JP-A-4-65476 and JP-A-4-292677. However, curing is insufficient due to large contents of alcohol and water. On the other hand, since a silicate originally has hydroxyl group or requires high temperature baking, migration of the silicate to the surface of coating film is inhibited. Also there is a problem that since the silane compound has a non-hydrolyzable group, hydrophilic property is insufficient. Due to the mentioned reasons, the stain-proofing property is not improved like the above-mentioned other proposals.

The situation is the same with respect to other paints of acryl, acrylic silicon, inorganic materials or the like, and a coating film having remarkably improved stain-proofing property is scarcely known. The present situation is such that though silane compounds are used as a dehydrating agent at the time of polymerizing or dispersing pigments, almost all amount of the silane compound reacts with water during production process and thus, the effect of improving the stain-proofing property of the resulting coating film is scarcely obtained.

Further as disclosed in, for example, WO94/06870, WO95/02645, JP-A-7-48540, JP-A-7-102211, JP-A-7-136584, JP-A-7-173429, JP-A-7-82520, JP-A-7-109435 and JP-A-7-60184, techniques using organometallic compounds for improving stain-proofing property have been proposed, but those techniques cannot satisfy requirements with respect to hydrophilic property of a coating film surface, repeatability thereof, stain-proofing property, curability, compatibility, recoatability, storage stability, pot life, floating resistance, antifoaming property, workability in coating and cracking of the coating film surface.

An object of the present invention is to provide a composition for paints being capable of forming a coating film which is remarkably excellent in stain-proofing property whereby neither stains in the air nor stains marked due to rain water adhere to or are deposited on the coating film surface, and to provide a stain-proofing agent for adding to the composition.

DISCLOSURE OF THE INVENTION

The present invention relates to a stain-proofing agent comprising, an organometallic compound represented by the formula (1):

$$X_b(OR^1)_a R^2_c \qquad (1)$$

wherein a is 0 or an integer of 1 to 6, b is 0 or an integer of 1 to 5, c is 0 or an integer of 1 to 6 (provided that $a+b+c \geq 3$, a and c are not zero at the same time), X are the same or different, and each is hydrogen atom or a monovalent organic group which has 1 to 5,000 carbon atoms and may contain oxygen atom, nitrogen atom, fluorine atom and/or chlorine atom, M is a metal atom having at least three valences, $R^1$ are the same or different, and each is hydrogen atom, a siloxane residue or a monovalent organic group which has 1 to 1,000 carbon atoms and may contain oxygen atom, nitrogen atom, fluorine atom and/or chlorine atom, $R^2$ are the same or different, and each is an organic group which has 1 to 20 carbon atoms, has a chelating ability and may contain oxygen atom, nitrogen atom, fluorine atom and/or chlorine atom;

an oligomer thereof; or a cooligomer comprising two or more of the organometallic compounds;

provided that a stain-proofing agent comprising a compound represented by the formula (2):

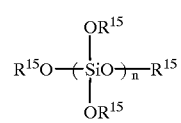

(2)

wherein n is an integer of 1 to 20, all of $R^{15}$ are different or at least two of $R^{15}$ are the same, each is a monovalent organic group having 1 to 1,000 carbon atoms and may contain oxygen atom, nitrogen atom and/or silicon atom, and a part or the whole of hydrogen atoms of the organic group may be substituted by fluorine atom or fluorine atom and chlorine atom, is excluded.

Further the present invention relates to a composition for paints which comprises the above-mentioned stain-proofing agent, a resin for paints and a curing agent and/or a curing catalyst.

BEST MODE FOR CARRYING OUT THE INVENTION

The stain-proofing agent of the present invention is an organometallic compound represented by the formula (1):

$X_bM(OR^1)_aR^2_c$ (1), an oligomer thereof or a cooligomer comprising at least two of the organometallic compounds; provided that a stain-proofing agent comprising a compound represented by the formula (2):

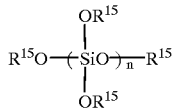
(2)

wherein n is an integer of 1 to 20, all of $R^{15}$ are different or at least two of $R^{15}$ are the same, each is a monovalent organic group having 1 to 1,000 carbon atoms and may contain oxygen atom, nitrogen atom and/or silicon atom, a part or the whole of hydrogen atoms of the organic group may be substituted by fluorine atom or fluorine atom and chlorine atom, is excluded.

The above-mentioned a is 0 or an integer of 1 to 6 from the viewpoints of surface concentrating property, hydrolyzability and releasing property, and is preferably an integer of 2 to 4.

The above-mentioned b is 0 or an integer of 1 to 5 from the viewpoints of surface concentrating property and hydrophilic property, and is preferably 0 or 1.

The above-mentioned c is 0 or an integer of 1 to 6 from the viewpoints of surface concentrating property, hydrolyzability and releasing property, and is preferably 0 or an integer of 1 to 3.

It is preferable that a molar ratio of X to $R^1+R^2$ is not more than 0.2 (b/(a+c)≦0.2).

A total amount of a, b and c is decided based on valence of the metal atom M. In the formula (1), since either of $OR^1$ or $R^2$ is necessary for stain-proofing property, surface concentrating property and hydrolyzability, there is no case where both of a and c are zero at the same time, and the total amount of a, b and c is at least 3.

The above X may be hydrogen atom and is preferably a monovalent organic group of the following (1) to (3) which has 1 to 5,000 carbon atoms and may contain oxygen atom, nitrogen atom, fluorine atom and/or chlorine atom.

(1) As the organic group X, there are, for example, $H(CH_2)_p$, $(CH_3)_2CH$, $H(CH_2)_pC=O$, $F(CF_2)_q(CH_2)_p$, $(CF_3)_2CH$ and $H(CF_2)_q(CH_2)_p$, and the like, wherein p is 0 or an integer of 1 to 6, q is an integer of 1 to 10, a part of fluorine atoms may be substituted by chlorine atoms. These organic groups may be linear or branched.

Examples thereof are, for instance, $CH_3$, $CH_3CH_2$, $CH_3CH_2CH_2$, $(CH_3)_2CH$, $CF_3CH_2$, $CF_3CF_2CH_2$, $(CF_3)_2CH$, $F(CF_2)_4CH_2CH_2$, $F(CF_2)_8CH_2CH_2$ and $H(CF_2)_4CH_2$, and the like. From the viewpoints of surface concentrating property, hydrolyzability and releasing property, $CF_3CF_2CH_2$ and $(CF_3)_2CH$ are preferable.

(2) Also as the organic group X, there are, for example, organic groups having a functional group such as $NH_2$, secondary amine, tertiary amine, OH, NCO, $CO_2H$, $CO_2Na$, $CO_2K$, $SO_3H$, $SO_3Na$, $SO_3K$, epoxy group and oxyethylene group $(CH_2CH_2O)$, and the like.

Examples thereof are, for instance, $H_2N(CH_2)_3$, $OCN(CH_2)_3$, $CH_3O(CH_2CH_2O)(CH_2)_3$, $CH_3O(CH_2CH_2O)_5(CH_2)_3$,
$CH_3O(CH_2CH_2O)_{10}(CH_2)_3$,

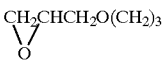

and the like. From the viewpoints of hydrophilic property, compatibility and adhesion, $OCN(CH_2)_3$ and $CH_3O(CH_2CH_2O)_5(CH_2)_3$ are preferable.

(3) Further as the organic group X, there are, for example, polymerizable organic groups which may contain oxygen atom, nitrogen atom, fluorine atom, chlorine atom, silicon atom, or the like.

Examples thereof are, for instance, $CH_2=C(CH_3)CO_2(CH_2)_3$, $CH_2=CH$, $CH_2=CHCH_2$, $CH_2=CHO(CH_2)_3$, $CH_2=CHOCO(CH_2)_3$, $CH_2=CHC_6H_4$, $CH_2=CHCO_2(CH_2)_3$ and the like. From the viewpoints of polymerizability and availability, $CH_2=C(CH_3)CO_2(CH_2)_3$ and $CH_2=CHO(CH_2)_3$ are preferable.

In the present invention, polymers or copolymers which have a molecular weight of 2,000 to 200,000, preferably 5,000 to 20,000 and are prepared by polymerizing or copolymerizing the compounds represented by the formula (1) which have the polymerizable organic group as mentioned above, are also preferable as the stain-proofing agent of the present invention.

The above $R^1$ are the same or different, and each is hydrogen atom, a siloxane residue or a monovalent organic group having 1 to 1,000 carbon atoms which may contain oxygen atom, nitrogen atom, fluorine atom and/or chlorine atom. From the viewpoints of surface concentrating property, hydrolyzability and releasing property, the number of carbon atoms is preferably from 1 to 100, more preferably from 1 to 16.

Among the $R^1$, examples of the preferred monovalent organic group are, for instance, $H(CH_2)_mC=O$, $(CH_3)_2CH$, $H(CH_2)_mC=O$, $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_mCF(CF_3)C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_mC=ONR^3$, $H(CF_2)_n(CH_2)_mC=ONR^3$, $F(CF_2)_n(CH_2)_mC=CH_2$, $H(CF_2)_n(CH_2)_mC=CH_2$, $F(CF_2)_n(CH_2)_mC=CF_2$ and $H(CF_2)_n(CH_2)_mC=CF_2$, wherein m is 0 or an integer of 1 to 6, n is an integer of 1 to 10, $R^3$ is alkyl which has 1 to 6 carbon atoms and may be linear or branched.

Examples of these organic groups are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$ and the like. From the viewpoints of surface concentrating property, hydrolyzability and releasing property, $CF_3CH_2$, $CF_3CF_2CH_2$, $CF_3(CF_2)_2CH_2$, $CF_3(CF_2)_3CH_2CH_2$, $CF_3C=O$ and $CF_3CF_2C=O$ are preferable, and $CF_3CH_2$ and $CF_3CF_2CH_2$ are more preferable.

Among the above $R^1$, examples of the siloxane residue are, for instance, $(Si(OR^1)_2O)_nR^1$, in which $R^1$ is the same as a monovalent organic group among the above-mentioned $R^1$, and the like.

The above $R^2$ may be the same or different and is an organic group which has an excellent chelating ability even if fluorine atom and/or chlorine atom are contained therein. It is preferable that $R^2$ have the number of carbon atoms of 1 to 20, preferably 2 to 10 from the viewpoints of surface concentrating property, hydrolyzability and releasing property.

In the present invention, since the stain-proofing agent, in which an organic group having such a chelating ability is bonded, is used, there can be obtained effects of excellent storage stability, reactivity, solubility and compatibility.

The organic group having the chelating ability as mentioned above can be derived from compounds as follows: for example, β-diketones such as 2,4-pentanedione and 2,4-heptanedione; keto esters such as methyl acetoacetate, ethyl acetoacetate and butyl acetoacetate; hydroxycarboxylic acids such as lactic acid, methyl lactate, ethyl lactate, ammonium lactate, salicylic acid, methyl salicylate, ethyl salicylate, malic acid, ethyl malate, tartaric acid,. ethyl tartrate, an ester and a salt thereof; keto-alcohols such as 4-hydroxy-4-methyl-2-pentanone, 4-hydroxy-2-pentanone, 4-hydroxy-2-heptanone and 4-hydroxy-4-methyl-2-heptanone; amino-alcohols such as monoethanolamine, diethanolamine, triethanolamine, N-methylmonoethanolamine, N-ethylmonoethanolamine, N,N-dimethylethanolamine and N,N-diethylethanolamine; active hydrogen compounds with enolic form such as diethyl malonate, methylolmelamine, methylolurea and methylolacrylamide; and the like. From the viewpoint of surface concentrating property, more preferable are compounds which are obtained by substituting a part or the whole of hydrogen atoms of the above-mentioned compounds by fluorine atom and/or chlorine atom.

Examples of the above-mentioned metal atom are, for instance, B, Al, Ga, In, Tl, Sc, Y, La, Ac, Si, Ge, Sn, Pb, Ti, Zr, Hf, As, Sb, Bi, V, Nb, Ta, Te, Po, Cr, Mo, W, At, Mn, Tc, Re, Fe, Co, Ni, Ru, Rh, Pd, Os, Ir, Pt and the like. From the viewpoints of synthesis and availability, Al, Ti, B, Zr or Si is preferable.

As the organometallic compound represented by the formula (1), oligomer thereof or oligomer comprising two or more of the organometallic compounds, there are, for example, the following organometallic compounds or oligomers or cooligomers obtained therefrom.

In case where in the formula (1), b is zero, there are:
$B(OCH_3)_3$, $B(OCH_2CF_2CF_3)_3$, $B(OCH(CF_3)_2)_3$, $B(OCH_2CH_2C_8F_{17})_3$, $B(OCH_2CF_2CF_3)_2(OCH_3)$, $B(OCH(CF_3)_2)_2(OCH_3)$, $B(OCH_2CH_2C_8F_{17})_2(OCH_3)$, $B(OCH_2CF_2CF_3)_2(OH)$, $B(OCH(CF_3)_2)_2(OH)$, $B(OCH_2CH_2C_8F_{17})_2(OH)$, $B(OCOCF_3)_3$, $B(OCOC_2F_5)_3$, $B(OCOC_8F_{17})_3$, $B(OCOCF_3)_2(OCH_3)$, $B(OCOC_2F_5)_2(OCH_3)$, $B(OCOC_8F_{17})_2(OCH_3)$, $Al(OCH_2CF_2CF_3)_3$, $Al(OCH(CF_3)_2)_3$, $Al(OCH_2CH_2C_8F_{17})_3$, $Al(OCH_2CF_2CF_3)_2(OCH_3)$, $Al(OCH(CF_3)_2)_2(OCH_3)$, $Al(OCH_2CH_2C_8F_{17})_2(OCH_3)$, $Al(OCH_2CF_2CF_3)_2(OH)$, $Al(OCH(CF_3)_2)_2(OH)$, $Al(OCH_2CH_2C_8F_{17})_2(OH)$, $Al(OCH_2CF_2CF_3)_2(OH)$, $Al(OCH(CF_3)_2)_2(OH)$, $Al(OCH_2CH_2C_8F_{17})_2(OH)$, $Al(OCOCF_3)_3$, $Al(OCOC_2F_5)_3$, $Al(OCOC_8F_{17})_3$, $Al(OCOCF_3)_2(OCH_3)$, $Al(OCOC_2F_5)_2(OCH_3)$, $Al(OCOC_8F_{17})_2(OCH_3)$, $AM(CF_3COCHCOCF_3)_3$, $AM(CF_3COCHCOCF_3)_2(CH_3COCHCOCH_3)$, $Al(CF_3COCHCOOC_2H_5)_3$, $Al(CF_3COCHCOOC_2H_5)_3$, $Al(CF_3COCHCOOC_2H_5)_2(CH_3COCHCOCH_3)$, $AM(CF_3COCHCOCF_3)_2(OH)$, $Al(CF_3COCHCOOC_2H_5)_2(OH)$, $Ti(OCH_2CF_2CF_3)_4$, $Ti(OCH(CF_3)_2)_4$, $Ti(OCH_2CH_2C_8F_{17})_4$, $Ti(OCH_2CF_2CF_3)_2(OCH_3)_2$, $Ti(OCH(CF_3)_2)_2(OCH_3)_2$, $Ti(OCH_2CH_2C_8F_{17})_2(OCH_3)_2$, $Ti(OCH_2CF_2CF_3)_2(OCH(CH_3)_2)_2$, $Ti(OCH(CF_3)_2)_2(OCH(CH_3)_2)_2$, $Ti(OCH_2CH_2C_8F_{17})_2(OCH(CH_3)_2)_2$, $Ti(OCH_2CF_2CF_3)_2(OH)_2$, $Ti(OCH(CF_3)_2)_2(OH)_2$, $Ti(OCH_2CH_2C_8F_{17})_2(OH)_2$, $Ti(OCOCF_3)_4$, $Ti(OCOC_2F_5)_4$, $Ti(OCOC_8F_{17})_4$, $Ti(OCOCF_3)_2(OCH_3)_2$, $Ti(OCOC_2F_5)_2(OCH_3)_2$, $Ti(OCOC_8F_{17})_2(OCH_3)_2$, $Ti(CF_3COCHCOCF_3)_2(OCH(CH_3)_2)_2$ and $Ti(CF_3COCHCOOC_2H_5)_2(OCH(CH_3)_2)_2$.

In case where in the formula (1), b is 1, there are:
$HSi(OCH_2CF_3)_3$, $HSi(OCH_2CF_2CF_3)_3$, $HSi(OCH(CF_3)_2)_3$, $HSi(OCH_2CH_2C_8F_{17})_3$, $HSi(OCH_2CF_2CF_3)_2(OCH_3)$, $HSi(OCH(CF_3)_2)_2(OCH_3)$, $HSi(OCH_2CH_2C_8F_{17})_2(OCH_3)$, $HSi(OCH_2CF_2CF_3)_2(OH)$, $HSi(OCH(CF_3)_2)_2(OH)$, $HSi(OCH_2CH_2C_8F_{17})_2(OH)$, $HSi(OCOCF_3)_3$, $HSi(OCOC_2F_5)_3$, $HSi(OCOC_8F_{17})_3$, $HSi(OCOCF_3)_2(OCH_3)$, $HSi(OCOC_2F_5)_2(OCH_3)$, $HSi(OCOC_8F_{17})_2(OCH_3)$, $CH_3Si(OCH_3)_3$, $CH_3Si(OCH_2CF_3)_3$, $CH_3Si(OCH_2CF_2CF_3)_3$, $CH_3Si(OCH(CF_3)_2)_3$, $CH_3Si(OCH_2CH_2C_8F_{17})_3$, $CH_3Si(OCH_2CF_2CF_3)_2(OCH_3)$, $CH_3Si(OCH(CF_3)_2)_2(OCH_3)$, $CH_3Si(OCH_2CH_2C_8F_{17})_2(OCH_3)$, $CH_3Si(OCHCF_2CF_3)_2(OH)$, $CH_3Si(OXH(CF_3)_2)_2(OH)$, $CH_3Si(OCH_2CH_2C_8F_{17})_2(OH)$, $CH_3Si(OCOCF_3)_3$, $CH_3Si(OCOC_2F_5)_3$, $CH_3Si(OCOC_8F_{17})_3$, $CH_3Si(OCOCF_3)_2(OCH_3)$, $CH_3Si(OCOC_2F_5)_2(OCH_3)$, $CH_3Si(OCOC_8F_{17})_2(OCH_3)$, $H_2N(CH_2)_3Si(OCH_2CF_3)_3$, $H_2N(CH_2)_3Si(OCH_2CF_2CF_3)_3$, $H_2N(CH_2)_3Si(OCH(CF_3)_2)_3$, $H_2N(CH_2)_3Si(OCH_2CH_2C_8F_{17})_3$, $H_2N(CH_2)_3Si(OCH_2CF_2CF_3)_2(OCH_3)$, $H_2N(CH_2)_3Si(OCH(CF_3)_2)_2(OCH_3)$, $H_2N(CH_2)_3Si(OCH_2CH_2C_8F_{17})_2(OCH_3)$, $H_2N(CH_2)_3Si(OCH_2CF_2CF_3)_2(OH)$, $H_2N(CH_2)_3Si(OCH(CF_3)_2)_2(OH)$, $H_2N(CH_2)_3Si(OCH_2CH_2C_8F_{17})_2(OH)$, $H_2N(CH_2)_3Si(OCOCF_3)_3$, $H_2N(CH_2)_3Si(OCOC_2F_5)_3$, $H_2N(CH_2)_3Si(OCOC_8F_{17})_3$, $H_2N(CH_2)_3Si(OCOCF_3)_2(OCH_3)$, $H_2N(CH_2)_3Si(OCOC_2F_5)_2(OCH_3)$, $H_2N(CH_2)_3Si(OCOC_8F_{17})_2(OCH_3)$, $OCN(CH_2)_3Si(OCH_2CF_3)_3$, $OCN(CH_2)_3Si(OCH_2CF_2CF_3)_3$, $OCN(CH_2)_3Si(OCH(CF_3)_2)_3$, $OCN(CH_2)_3Si(OCH_2CH_2C_8F_{17})_3$, $OCN(CH_2)_3Si(OCH_2CF_2CF_3)_2(OCH_3)$, 64 $OCN(CH_2)_3Si(OCH(CF_3)_2)_2(OCH_3)$, $OCN(CH_2)_3Si(OCH_2CH_2C_8F_{17})_2(OCH_3)$, $OCN(CH_2)_3Si(OCOCF_3)_3$, $OCN(CH_2)_3Si(OCOC_8F_{17})_3$, $OCN(CH_2)_3Si(OCOCF_3)_2(OCH_3)$, $OCN(CH_2)_3Si(OCOC_2F_5)_2(OCH_3)$, $OCN(CH_2)_3Si(OCOC_8F_{17})_2(OCH_3)$, $CH_3O(CH_2CH_2O)_g(CH_2)_3Si(OCH_2CF_3)_3$, $CH_3O(CH_2CH_2O)_g(CH_2)_3Si(OCH_2CF_2CF_3)_3$, $CH_3O(CH_2CH_2O)_g(CH_2)_3Si(OCH(CF_3)_2)_3$, $CHSO(CH_2CH_2O)_g(CH_2)_3Si(OCH_2CH_2C_8F_{17})_3$, $CH_3O(CH_2CH_2O)_g(CH_2)_3Si(OCH_2CF_2CF_3)_2(OCH_3)$, $CH_3O(CH_2CH_2O)_g(CH_2)_3Si(OCH(CF_3)_2)_2(OCH_3)$, $CH_3O(CH_2CH_2O)_g(CH_2)_3Si(OCH_2CH_2C_8F_{17})_2(OCH_3)$, $CH_3O(CH_2CH_2O)_g(CH_2)_3Si(OCH_2CF_2CF_3)_2(OH)$, $CH_3O(CH_2CH_2O)S(CH_2)_3Si(OCH(CF_3)_2)_2(OH)$, $CH_3O(CH_2CH_2O)_g(CH_2)_3Si(OCH_2CH_2C_8F_{17})_2(OH)$, $CH_3O(CH_2CH_2O)_g(CH_2)_3Si(OCOCF_3)_3$, $CH_3O(CH_2CH_2O)_g(CH_2)_3Si(OCOC_2F_5)_3$, $CH_3O(CH_2CH_2O)_g(CH_2)_3Si(OCOC_8F_{17})_3$, $CH_3O(CH_2CH_2O)_g(CH_2)_3Si(OCOCF_3)_2(OCH_3)$, $CH_3O(CH_2CH_2O)_g(CH_2)_3Si(OCOC_2F_5)_2(OCH_3)$, $CH_3O(CH_2CH_2O)_g(CH_2)_3Si(OCOC_8F_{17})_2(OCH_3)$, wherein g is an integer of 1 to 100, $CH_2=C(CH_3)CO_2(CH_2)_3Si(OCH_2CF_3)_3$, $CH_2=C(CH_3)CO_2(CH_2)_3Si(OCH_2CF_2CF_3)_3$, $CH_2=C(CH_3)CO_2(CH_2)_3Si(OCH(CF_3)_2)_3$, $CH_2=C(CH_3)CO_2(CH_2)_3Si(OCH_2CH_2C_8F_{17})_3$, $CH_2=C(CH_3)CO_2(CH_2)_3Si(OCH_2CF_2CF_3)_2(OCH_3)$, $CH_2=C(CH_3)CO_2(CH_2)_3Si(OCH(CF_3)_2)_2(OCH_3)$, $CH_2=C(CH_3)CO_2(CH_2)_3Si(OCH_2CH_2CaF_{17})_2(OCH_3)$, $CH_2=C(CH_3)CO_2(CH_2)_3Si(OCH_2CF_2CF_3)_2(OH)$, $CH_2=C(CH_3)CO_2(CH_2)_3Si(OCH(CF_3)_2)_2(OH)$, $CH_2=C(CH_3)CO_2(CH_2)_3Si(OCH_2CH_2C_8F_{17})_2(OH)$, $CH_2=C(CH_3)CO_2(CH_2)_3Si(OCOCF_3)_3$, $CH_2=C(CH_3)CO_2(CH_2)_3Si(OCOC_2F_5)_3$, $CH_2=C(CH_3)CO_2(CH_2)_3Si(OCOC_8F_{17})_3$, $CH_2=C(CH_3)CO_2(CH_2)_3Si(OCOCF_3)_2(OCH_3)$, $CH_2=C(CH_3)CO_2(CH_2)_3Si(OCOC_2F_5)$-$z(OCH_3)$ and $CH_2=C(CH_3)CO_2(CH_2)_3Si(OCOC_8F_{17})_2(OCH_3)$, Among the above-mentioned cooligomers, as materials for cooligomers other than those prepared from the organometallic compound of the formula (1), in which b and c are zero at the same time and M is Si, there are compounds mentioned below.

Si(OCH$_2$CF$_2$CF$_3$)$_4$, Si(OCH(CF$_3$)$_2$)$_4$, Si(OCH$_2$CH$_2$C$_8$F$_{17}$)$_4$, Si(OCH$_2$CF$_2$CF$_2$H)$_4$, Si(OCH$_2$C$_4$F$_8$H)$_4$, Si(OCH$_2$CF$_2$CF$_3$)$_2$(OCH$_3$)$_2$, Si(OCH(CF$_3$)$_2$)$_2$(OCH$_3$)$_2$, Si(OCH$_2$CH$_2$C$_8$F$_{17}$)$_2$(OCH$_3$)$_2$, Si(OCH$_2$CF$_2$CF$_2$H)$_2$(OCH$_3$)$_2$, Si(OCH$_2$CF$_2$CH$_2$H)$_2$(OC$_4$H$_9$)$_2$, Si(OCH$_2$CF$_2$CF$_3$)$_2$(OH)$_2$, Si(OCH(CF$_3$)$_2$)$_2$(OH)$_2$, Si(OCH$_2$CH$_2$C$_8$F$_{17}$)$_2$(OH)$_2$, Si(OCH$_2$CF$_2$CF$_2$H)$_2$(ON=CCH$_3$(C$_2$H$_5$))$_2$, Si(OCOCF$_3$)$_4$, Si(OCOC$_2$F$_5$)$_4$, Si(OCOC$_8$F$_{17}$)$_4$, Si(OCOCF$_3$)$_2$(OCH$_3$)$_2$, Si(OCOC$_2$F$_5$)$_2$(OCH$_3$)$_2$, Si(OCOC$_8$F$_{17}$)$_2$(OCH$_3$)$_2$, Si(OCH$_2$CF$_2$CF$_3$)$_3$(OCH$_2$CH$_2$)$_h$OHC$_3$, Si(OCH(CF$_3$)$_2$)$_3$(OCH$_2$CH$_2$)$_h$OCH$_3$, Si(OCH$_2$CH$_2$C$_8$F$_{17}$)$_3$(OCH$_2$CH$_2$)$_h$OHC$_3$, Si(OCH$_2$CF$_2$CF$_3$)$_2$(OCH$_3$)(OCH$_2$CH$_2$)$_h$OHC$_3$, Si(OCH(CF$_3$)$_2$)$_2$(OCH$_3$)(OCH$_2$CH$_2$)$_h$OHC$_3$, Si(OCH$_2$CH$_2$C$_8$F$_{17}$)$_2$(OCH$_3$)(OCH$_2$CH$_2$)$_h$OHC$_3$, Si(OCH$_2$CF$_2$CF$_3$)$_2$(OH)(OCH$_2$CH$_2$)$_h$OCH$_3$, Si(OCH(CF$_3$)$_2$)$_2$(OH)(OCH$_2$CH$_2$)$_h$OHC$_3$, Si(OCH$_2$CH$_2$C$_8$F$_{17}$)$_2$(OH)(OCH$_2$CH$_2$)$_h$OHC$_3$, Si(OCOCF$_3$)$_3$(OCH$_2$CH$_2$)$_h$OHC$_3$, Si(OCOC$_2$F$_5$)$_3$(OCH$_2$CH$_2$)$_h$OHC$_3$, Si(OCOC$_8$F$_{17}$)$_3$(OCH$_2$CH$_2$)$_h$OHC$_3$, Si(OCOCF$_3$)$_2$(OCH$_3$)(OCH$_2$CH$_2$)$_h$OHC$_3$, Si(OCOC$_2$F$_5$)$_2$(OCH$_3$)(OCH$_2$CH$_2$)$_h$OHC$_3$, Si(OCOC$_8$F$_{17}$)$_2$(OCH$_3$)(OCH$_2$CH$_2$)$_h$OHC$_3$, Si(OCH$_3$)$_4$, Si(OC$_2$H$_5$)$_4$, Si(OC$_4$H$_9$)$_4$ and Si(ON=CCH$_3$(C$_2$H$_5$))$_4$, wherein h is an integer of 1 to 100.

Examples of the oligomer or cooligomer of the present invention are linear, branched, cyclic and three-dimensional oligomers or cooligomers.

In the present invention, the degree of polymerization of the oligomer or cooligomer is preferably from 2 to 1,000, more preferably from 4 to 100. When the degree of polymerization is smaller, a boiling point of the oligomer or cooligomer is lowered, and the oligomer or cooligomer becomes easy to be vaporized at coating and is difficult to be incorporated into a coating film. When the degree of polymerization exceeds 1,000, there is a tendency that control of the degree of polymerization at synthesis is difficult, a viscosity of the oligomer or cooligomer becomes high and workability becomes inferior. When in the formula (1), a is 4, b and c are zero, M is Si and fluorine atom is contained, it is preferable that the degree of polymerization of the oligomer or cooligomer is more than 20 and not more than 100 from the viewpoints of appearance, antisagging property and alkali resistance of a coating film. There are, for instance, oligomers or cooligomers such as:

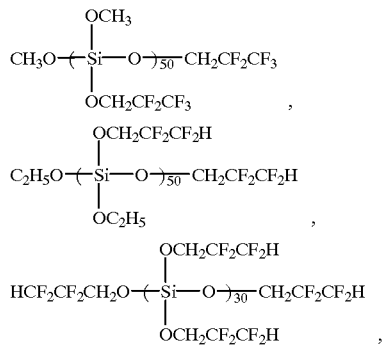

and the like.

A weight average molecular weight of the oligomer or cooligomer of the present invention which is measured with GPC (calculated based on polystirene by using tetrahydrofuran as an eluent) is preferably from 500 to 10,000, more preferably from 1,000 to 5,000. When the molecular weight becomes smaller, an effect of hydrophilization tends to be lowered. When more than 10,000, gellation tends to occur easily at the time of synthesizing and during storage.

The organometallic compound represented by the formula (1) can be synthesized by reacting one or more of a metal halide, alkyl metal, metal alkoxide, metal chelate and the like, said metal constituting the organometallic compound, with one or more of alcohol, carboxylic acid, oxime, β-diketone, β-keto ester, alkali metal alkoxide, alkali metal salt of carboxylic acid and the like, said organic moieties corresponding to the organic group of the organometallic compound, with stirring usually at about 1 atm at a temperature of −20° to 100° C., preferably 0° to 80° C. or preferably under dried inert gas atmosphere, in the presence of a catalyst, if necessary. Also a reaction solvent can be used.

In such a synthesizing method, by adjusting the temperature to 0° to 200° C., preferably 20° to 100° C. and adding water gradually to the organometallic compound of the formula (1) so that the reaction solution becomes as uniform as possible, the organometallic compound of the formula (1) reacts with water to be hydrolyzed and at nearly the same time condensated to give an oligomer of the organometallic compound.

Also in the above-mentioned synthesizing method, use of at least two kinds of the organometallic compounds represented by the formula (1) can give a cooligomer. The cooligomer may contain two or more metals in its molecular chain.

The degree of polymerization of the oligomer or cooligomer of the present invention can be regulated with a molar ratio of reacting water to, for example, the organometallic compound of the formula (1). For example, when the reaction is carried out within the molar ratio of [H$_2$O]/[Organometallic compound of formula (1)]=0.4 to 0.95, there can be obtained an oligomer or cooligomer having the degree of polymerization of about 2 to about 20. Also by adjusting the molar ratio within the range of 0.94 to 2.0, there can be obtained an oligomer or cooligomer having the degree of polymerization of more than 20. A ratio (molar ratio) of constructive units constituting a cooligomer obtained by using two kinds of organometallic compounds of the formula (1) is preferably from 1/9 to 9/1.

Examples of the catalyst are, for instance, acids and alkalis such as hydrochloric acid, sulfuric acid, acetic acid, paratoluene sulfonic acid, ammonia, trimethylamine, triethylamine, tributylamine, 1,8-diazabicyclo(5,4,0)undecene-7(DBU), (−)-sparteine, 4-N,N-dimethylaminopyridine, monoethanolamine, triethanolamine, N,N,N',N'-tetramethylethylenediamine, sodium hydroxide, potassium hydroxide, sodium hydrogencarbonate, potassium t-butoxide, sodium ethoxide, tetramethylammonium hydroxide, tetramethylammonium hydrogensulfate, tetrabutylammonium hydroxide and tetrabutylammonium hydrogensulfate; and organometallic compounds and organometallic salts such as dibutyltindilaurate, dibutyltinacetate, dioctyltinmaleate, tetraisopropyl titanate and tetrabutyl titanate. From a point that a residue of the catalyst is easily removed from a product, preferable are hydrochloric acid, ammonia and triethylamine.

Examples of the reaction solvent are alcohols such as methanol, ethanol, isopropanol, n-butanol, t-butanol, octanol, 2,2,2-trifluoroethanol and 2,2,3,3,3-pentafluoropropanol; ethers such as tetrahydrofuran, 1,4-dioxane and tetrahydropyran ketones and esters such as acetone and 2-methoxyethyl acetate; amides such as N,N-dimethylformamide, N,N-dimethylacetamide, N-methylacetamide, N-methylpyrrolidone and polyoxazoline; carboxylic acids such as acetic acid, trifluoroacetic acid and $F(CH_2)_8COOH$; fluorine-containing aromatic compounds such as trifluoromethylbenzene and m-bis(trifluoromethyl)benzene; and the like. From the viewpoint of high solubility, 2,2,2-trifluoroethanol, 2,2,3,3,3-pentafluoropropanol, tetrahydrofuran 1,4-dioxane and tetrahydropyran are preferable.

The organometallic compound of the formula (1), its oligomer or cooligomer comprising at least two of the organometallic compounds can provide a composition for paints having excellent stain-proofing property, low electrostatically charging property and anti-haze property.

In the organometallic compound of the formula (1), its oligomer or cooligomer comprising at least two of the organometallic compounds, since at least one of $R^1$ and $R^2$ has fluorine atom, there can be obtained effects of, for example, excellent surface concentrating property and repeatability of surface hydrophilization of a coating film.

Also when a fluorine atom content in the organometallic compound of the formula (1), its oligomer or cooligomer comprising at least two of the organometallic compounds is at least 5% by weight, preferably 15 to 60% by weight, there can be obtained effects of, for example, excellent surface concentrating property and repeatability of surface hydrophilization of a coating film.

Further there can be obtained effects of, for example, excellent appearance, antisagging property and alkali resistance of a coating film when in the formula (1), a is 4, b and c are zero, M is Si and the degree of polymerization of the oligomer of the organometallic compound having fluorine atom or the cooligomer comprising at least two of the above-mentioned organometallic compounds is more than 20 and not more than 100.

A stain-proofing agent comprising the compound of the formula (2) is excluded from the stain-proofing agent comprising the organometallic compound of the formula (1), its oligomer or cooligomer comprising at least two of the organometallic compounds.

In the formula (2), n is an integer of 1 to 20.

The above-mentioned organic groups $R^{15}$ are all different or at least two thereof are the same. Each is a monovalent organic group having 1 to 1,000 carbon atoms and may contain oxygen atom, nitrogen atom and/or silicon atom. A part or the whole of hydrogen atoms of the mentioned organic group may be substituted by fluorine atom or fluorine atom and chlorine atom.

The number of carbon atoms of the above-mentioned organic groups $R^{15}$ may be from 1 to 100.

The above-mentioned organic groups $R^{15}$ may be either of linear or branched substituents. When those substituents have fluorine atom, branched substituent is used.

The above-mentioned organic groups $R^{15}$ may contain oxygen atom, nitrogen atom and/or silicon atom. Examples thereof are a group having fluorine atom or non-hydrolyzable group-containing silicon atom, and further a trifluoromethyl group and dimethylsiloxane chain-containing group.

A part of hydrogen atoms of the above-mentioned organic group $R^{15}$ may be substituted by fluorine atom.

Also a part of hydrogen atoms of the above-mentioned organic group $R^{15}$ may be substituted by fluorine atom and chlorine atom.

Examples of the organic group containing no fluorine atom among the organic groups $R^{15}$ are, for instance, $CH_3$, $C_2H_5$, $CH_3CH_2CH_2$, $(CH_3)_2CH$, $CH_3(CH_2)_2CH_2$, dimethylsiloxane chain-containing group and the like.

Examples of the organic group containing fluorine atom among the organic groups $R^{15}$ are, for instance, those represented by $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$ ($F(CF_2)_n(CH_2)_m)_2N$, $((CF_3)_2CH)_2N$, $(H(CF_2)_n(CH_2)_m)_2N$, $F(CF_2)_nO$ $(CF(CF_3)CF_2O)_mCF(CF_3)C=O$, $(F(CF_2)_n(CH_2)_m)_2C=N$, $((CF_3)_2CH)_2C=N$, $(H(CF_2)(CH_2)_m)_2C=N$, $F(CF_2)_n(CH_2)_mC=ONR^{17}$, $H(CF_2)_n(CH_2)_mC=ONR^{17}$, $F(CF_2)_n(CH_2)_mC=CH_2$, $H(CF_2)_n(CH_2)_mC=CH_2$, $F(CF_2)_n(CH_2)_mC=CF_2$ and $H(CF_2)_n(CH_2)_mC=CF_2$, wherein m is 0 or an integer of 1 to 6, n is an integer of 1 to 10, $R^{17}$ represents an alkyl having 1 to 6 carbon atoms, an organic group containing fluorine atom may be branched.

Examples of the organic group $R^{15}$ are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_2C=O$, $CF_3(CF_2)_6C=O$, $CF_3(CF_2)_7C=O$ and the like.

Examples of the compound represented by the formula (2) are, for instance;

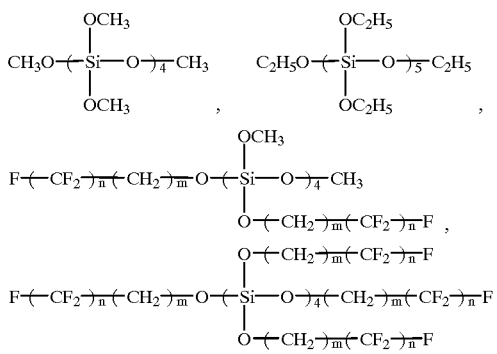

wherein m and n are the same as above, and further there are;

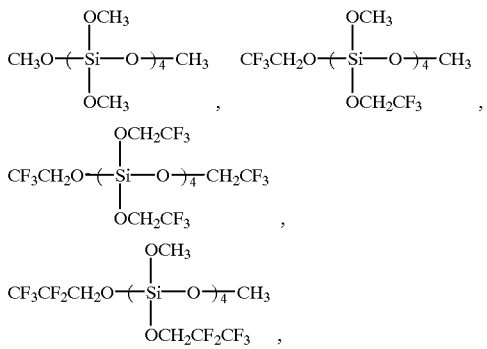

and the like.

The composition for paints of the present invention comprises (A) any of the above-mentioned stain-proofing agents; (B) resin for paints; (C) curing agent and/or curing catalyst. The coating film obtained from the composition exhibits an effect of giving remarkably excellent stain-proofing property, low electrostatically charging property and anti-haze property.

Examples of the resin for paints are, for instance, a fluoroolefin copolymer having hydroxyl group and/or carboxyl group, acrylic polyol resin, acrylic silicon resin, fluorine-containing silicone resin, inorganic resin, homopolymer or copolymer of vinylidene fluoride containing no functional group and the like which are solvent-soluble. The fluoroolefin copolymer having hydroxyl group and/or carboxyl group and acrylic polyol resin are preferred from a point that they have been widely used.

In addition to the above resins, there is a fluorine-containing resin (such as a vinylidene fluoride homopolymer or copolymer disclosed in JP-B-43-10363, JP-A-3-28206 and JP-A-4-189879) which has no functional group. The fluorine-containing resin can be blended in the above-mentioned resins having a functional group. When the resin having no functional group is used, it is not always necessary to use a curing agent and curing catalyst in the composition for paints of the present invention.

Examples of the fluoroolefin copolymer having hydroxyl group and/or carboxyl group are, for instance, those disclosed in each of JP-B-60-21686, JP-A-3-121107, JP-A-4-279612, JP-A-4-28707 and JP-A-2-232221. A number average molecular weight of the copolymer (measured by GPC) is from 1,000 to 100,000, preferably 1,500 to 30,000. When the molecular weight is less than 1,000, curability and weather resistance tend to be insufficient, and when more than 100,000, there is a tendency that problems arise with respect to workability and coating procedures.

A hydroxyl value of the copolymer is from 0 to 200 (mgKOH/g), preferably 0 to 150 (mgKOH/g). When the hydroxyl value decreases, there is a tendency that curing failure is easy to occur, and when the hydroxyl value exceeds 200 (mgKOH/g), there is a tendency that problem arises with respect to flexibility of a coating film.

An acid value of the copolymer is from 0 to 200 (mgKOH/g), more preferably 0 to 100 (mgKOH/g). When the acid value decreases, there is a tendency that curing failure is easy to occur, and when the acid value exceeds 200 (mgKOH/g), there is a tendency that problem arises with respect to flexibility of a coating film.

As one of the copolymers, there can be used tetrafluoroethylene copolymer from the viewpoints of stain-proofing property, stain removable property and corrosion resistance.

Examples of the copolymer are those commercially available, for instance, Zeffle available from Daikin Industries, Ltd., Lumiflon available from Asahi Glass Kabushiki Kaisha, Cefral Coat available from Central Glass Kabushiki Kaisha, Fluonate available from Dai Nippon Ink Kagaku Kogyo Kabushiki Kaisha, Zaflon available from Toa Gosei Kabushiki Kaisha and the like.

The acrylic polyol resin may be a polymer comprising, for example, the following hydroxyl-containing polymerizable unsaturated monomer (a) and if necessary, other polymerizable unsaturated monomer (b) as monomer components.

As the monomer (a), there can be exemplified a compound represented by the following formulae (4) to (7).

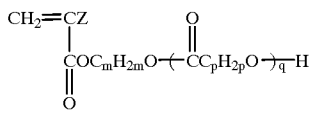

(4)

wherein $R^4$ is hydrogen atom or a hydroxyalkyl group.

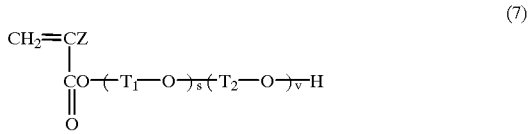

(5)

wherein $R^4$ is the same as above.

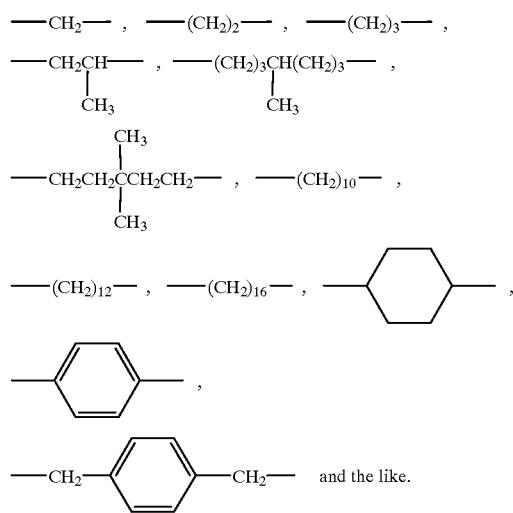

(6)

wherein Z is hydrogen atom or methyl, m is an integer of 2 to 8, p is an integer of 2 to 18, q is 0 or an integer of 1 to 7.

(7)

wherein Z is the same as above, $T_1$ and $T_2$ are the same or different and each is a divalent hydrocarbon group having 1 to 20 carbon atoms, each of s and v is 0 or an integer of 1 to 10, provided that the sum of s and v is 1 to 10.

The hydroxyalkyl group in the formulae (4) and (5) is one having alkyl moiety of 1 to 6 carbon atoms. Examples are —$C_2H_4OH$, —$C_3H_6OH$, —$C_4H_8OH$ and the like.

Examples of the divalent hydrocarbon group having 1 to 20 carbon atoms in the formula (7) are, for instance,

—$CH_2$—, —$(CH_2)_2$—, —$(CH_2)_3$—,

—$CH_2CH$—, —$(CH_2)_3CH(CH_2)_3$—,
  |                          |
  $CH_3$                    $CH_3$ $CH_3$
            |
—$CH_2CH_2CCH_2CH_2$—,   —$(CH_2)_{10}$—,
            |
            $CH_3$

—$(CH_2)_{12}$—, —$(CH_2)_{16}$—, ,

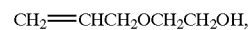,

—$CH_2$—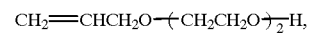—$CH_2$—   and the like.

Examples of the monomer component of the formula (4) are, for instance, $CH_2$=CHOH, $CH_2$=CHO$(CH_2)_4$OH and the like.

Examples of the monomer component of the formula (5) are, for instance, $CH_2$=CHCH$_2$OH, $CH_2$=CHCH$_2$OCH$_2$CH$_2$OH, $CH_2$=CHCH$_2$O$-(CH_2CH_2O)_{\overline{2}}$H, $CH_2$=CHCH$_2$O$-(CH_2CH_2O)_{\overline{3}}$H  and the like.

Examples of the monomer component of the formula (6) are, for instance, $CH_2$=C(CH$_3$)COOC$_2$H$_4$OH,

CH₂=CHCOOC₃H₆OH,

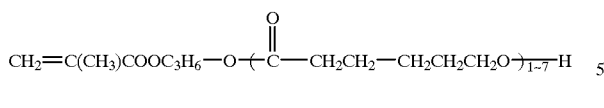

and the like.

Examples of the monomer component of the formula (7) are, for instance,

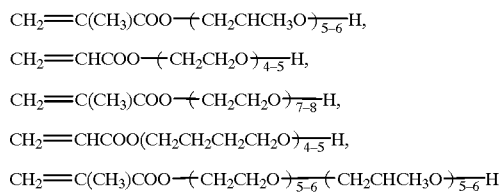

and the like.

In addition, there can be used an adduct of the hydroxyl-containing unsaturated monomer represented by the formulae (4) to (7) and lactone such as ε-caprolactone or γ-valerolactone.

Other polymerizable unsaturated monomer (b)

The following (b-1) to (b-9) can be used.

(b-1) Olefin compound: For example, ethylene, propylene, butylene, isoprene, chloroprene and the like.

(b-2) Vinyl ether and allyl ether: For example, linear alkyl vinyl ether such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether or 4-methyl-1-pentyl vinyl ether; cycloalkyl vinyl ether such as cyclopentyl vinyl ether or cyclohexyl vinyl ether; aryl vinyl ether such as phenyl vinyl ether or o-, m- or p-dimethylphenyl vinyl; arylalkyl vinyl ether such as benzyl vinyl ether or phenethyl vinyl ether; and the like.

(b-3) Vinyl ester and propenyl ester: For example, vinyl ester such as vinyl acetate, vinyl lactate, vinyl butyrate, vinyl isobutyrate, vinyl caproate, vinyl isocaproate, vinyl pivalate or vinyl caprate; propenyl ester such as isopropenyl acetate or isopropenyl propionate; and the like (b-4) Acrylate or methacrylate: For example, C1 to 18 alkyl ester of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate or lauryl methacrylate; C2 to 18 alkoxyalkyl ester of acrylic acid or methacrylic acid such as methoxybutyl acrylate, methoxybutyl methacrylate, methoxyethyl acrylate, methoxyethyl methacrylate, ethoxybutyl acrylate or ethoxybutyl methacrylate; and the like.

(b-5) Aromatic vinyl compound: For example, stirene, α-methylstirene, vinyltoluene, p-chlorostirene and the like.

(b-6) Others: Acrylonitrile, methacrylonitrile and the like.

(b-7) Carboxyl-containing monomer: Carboxyl-containing vinyl monomer represented by the formula (8):

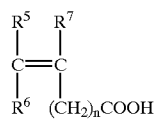

wherein $R^5$, $R^6$ and $R^7$ are the same or different, and each is hydrogen atom, alkyl, phenyl, carboxyl or ester group, n is 0 or 1, or the formula (9):

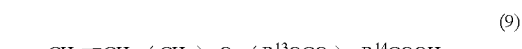

wherein $R^{13}$ and $R^{14}$ are the same or different, and each is saturated or unsaturated linear or cyclic alkyl, n is 0 or 1, m is 0 or 1. Examples thereof are, for instance, acrylic acid, methacrylic acid, vinylacetic acid, crotonic acid, cinnamic acid, 3-allyloxypropionic acid, itaconic acid, itaconic acid monoester, maleic acid, maleic acid monoester, maleic anhydride, fumaric acid, fumaric acid monoester, vinyl phthalate, vinyl pyromellitate and the like.

(b-8) Epoxy-containing monomer:

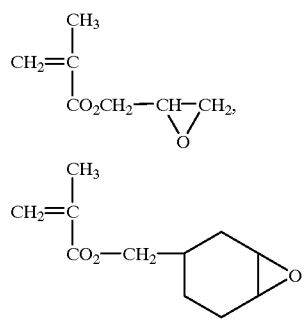

(b9) Amino-containing monomer:

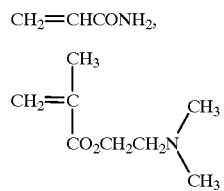

The acrylic polyol resin may contain hydroxyl, carboxyl, epoxy or amino.

A hydroxyl value of the acrylic polyol resin is from 0 to 200 (mgKOH/g), preferably 0 to 100 (mgKOH/g). When the hydroxyl value decreases, curing failure tends to occur easily, and when the hydroxyl value exceeds 200 (mgKOH/g), there is a tendency that problem arises with respect to flexibility of a coating film.

An acid value of the acrylic polyol resin is from 0 to 200 (mgKOH/g), preferably 0 to 100 (mgKOH/g). When the acid value decreases, curing failure tends to occur easily, and when the acid value exceeds 200 (mgKOH/g), there is a tendency that problem arises with respect to flexibility of a coating film.

As a commercially available acrylic polyol resin, there can be used, for example, Dianal available from Mitsubishi Rayon Kabushiki Kaisha, Acrydic available from Dai Nippon Ink Kagaku Kogyo Kabushiki Kaisha, Hitaloid available from Hitachi Kasei Kogyo Kabushiki Kaisha, Olester available from Mitsui Toatsu Kagaku Kabushiki Kaisha or the like.

The acrylic silicon resin may be one prepared by polymerizing the following acrylic silicon monomer with the compound of the formulae (4) to (7) and/or other polymerizable unsaturated monomer (b).

The acrylic silicon monomer is a compound having, in one molecule thereof, at least one silane group and a radical polymerizing unsaturated group. Examples of the radical polymerizing unsaturated group are, for instance:

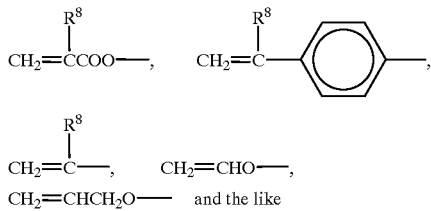

wherein $R^8$ is hydrogen atom or methyl.

As the silane-containing polymerizable unsaturated monomer having a radical polymerizing unsaturated group of:

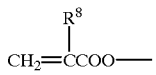

there is, for example, a compound represented by the following formula (10):

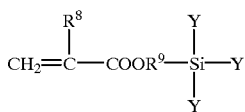

(10)

wherein $R^9$ is a hydrocarbon group having 1 to 20 carbon atoms, Y is the same or different and is hydrogen atom, hydroxyl, hydrolyzable group, alkyl having 1 to 8 carbon atoms, aryl or arylalkyl, provided that at least one of Y is hydrogen atom, hydroxyl or hydrolyzable group.

Examples of the compound represented by the formula (10) are, for instance,
γ-(meth)acryloxypropyltrimethoxysilane,
γ-(meth)acryloxypropyltriethoxysilane,
γ-(meth) acryloxypropyltripropoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth) acryloxybutylphenyldipropoxysilane,
γ-(meth) acryloxypropyldimethylmethoxysilane,
γ-(meth)acryloxypropyldimethylethoxysilane,
β-(meth)acryloxypropylphenylmethylmethoxysilane,
β-(meth)acryloxypropylphenylmethylethoxysilane,
β-(meth)acryloxypropyltrisilanol,
γ-(meth)acryloxypropylmethyldihydroxysilane,
γ-(meth)acryloxybutylphenyldihydroxysilane,
γ-(meth)acryloxypropyldimethylhydroxysilane,
γ-(meth)acryloxypropylphenylmethylhydroxysilane and the like.

The acrylic silicon resin may have a hydrolyzable silyl group, hydroxyl or epoxy.

As a commercially available acrylic silicon resin, there can be used, for example, Gemlac available from Kaneka Corporation, Kuriyamer available from Sanyo Kasei Kogyo Kabushiki Kaisha or the like.

In the present invention, as the above-mentioned resin for paints, there can be used inorganic materials such as a non-fluorine-containing metal (Si, Ti, Al, etc.) alkoxide containing non-hydrolyzable group, a non-fluorine-containing organopolysiloxane containing non-hydrolyzable group and a metal (Si, Ti, Al, etc.) alkoxide having no fluorine atom.

As a commercially available inorganic material, there can be used, for example, Ecolton available from Gunze Sangyo Kabushiki Kaisha, Glaska available from Nippon Gosei Rubber Kabushiki Kaisha, Porcelin available from Tohpe Kabushiki Kaisha, Bell Clean and Bell Hard available from Nippon Yushi Kabushiki Kaisha, SH, SR and DC Series available from Toray Dow Corning Silicone Kabushiki Kaisha, KR Series available from Shin-Etsu Kagaku Kogyo Kabushiki Kaisha, Planeact available from Ajinomoto Kabushiki Kaisha, organotitanate available from Nippon Soda Kabushiki Kaisha, aluminium alcolate and aluminium chelate compound available from Kawaken Fine Chemical Kabushiki Kaisha, zirconium alkoxide available from Hokko Kagaku Kabushiki Kaisha, modified silicone oil and MMCA available from Nippon Nuicar Kabushiki Kaisha or the like.

Examples of the fluorine-containing silicone resin are, for instance, those disclosed in JP-A-4-279612 and the like.

As the curing agent, there is, for instance, isocyanate compound, blocked isocyanate compound, melamine resin, dibasic acid, silane compound containing non-hydrolyzable group, epoxy resin, acid anhydride or the like. From the viewpoints of weather resistance and acid rain resistance, preferable are isocyanate, blocked isocyanate and epoxy resin.

Examples of the isocyanate compound and blocked isocyanate compound are, for instance, 2,4-tolylene diisocyanate, diphenylmethane-4,4-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, blocked isocyanates and the like. The isocyanate compound and blocked isocyanate compound are not limited to them.

A mixing ratio of the isocyanate to the resin for paints is preferably from 0.5 to 5.0 in NCO/OH (mole ratio), further preferably 0.8 to 1.2. When the isocyanate is of moisture curing type, 1.1 to 1.5 is preferred.

Non-restricted examples of the melamine resin are, for instance, a melamine resin, a methylolated melamine resin obtained by methylolating melamine, an alkyl-etherified melamine resin obtained through etherification of a methylolated melamine by an alcohol such as methanol, ethanol or butanol and the like.

Non-restricted examples of the epoxy compound are, for instance,

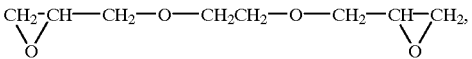

-continued

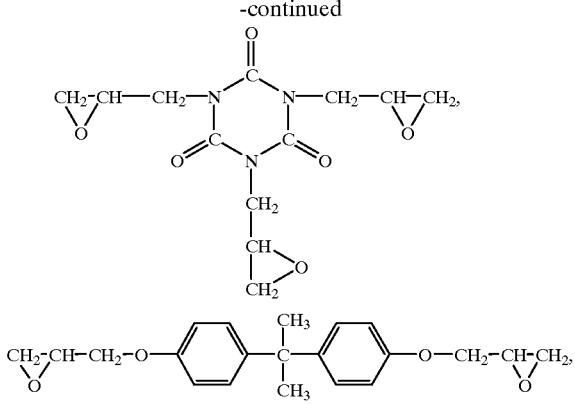

and the like.

Non-restricted examples of the acid anhydride are, for instance, phthalic anhydride, trimellitic anhydride, pyromellitic anhydride, 1,2-cyclohexyldicarboxylic anhydride, succinic anhydride, maleic anhydride and the like.

Dibasic acids such as fumaric acid, succinic acid, adipic acid, azelaic acid, sebacic acid, dodecanedioic acid and 1,2-cyclohexyldicarboxylic acid are also used as the curing agent.

Examples of the curing catalyst are, for instance, organotin compound, organic acidic phosphate, organotitanate compound, reaction product of acidic phosphate and amine, saturated or unsaturated polycarboxylic acid or its acid anhydride, organic sulfonic acid, amine compound, aluminium chelate compound, titanium chelate compound, zirconium chelate compound and the like.

Examples of the organotin compound are, for instance, dibutyltindilaurate, dibutyltinmaleate, dioctyltinmaleate, dibutyltindiacetate and the like.

Examples of the organic acidic phosphate are, for instance,

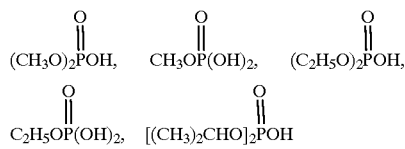

and the like.

Examples of the organotitanate compound are, for instance, titanate such as tetrabutyl titanate, tetraisopropyl titanate or triethanolamine titanate.

Further examples of the amine compound are, for instance, amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine or 1,8-diazabicyclo(5.4.0)undecene-7 (DBU) and a salt thereof with carboxylic acid; low molecular weight polyamide resin obtained from excess polyamine and polybasic acid; reaction product of excess polyamine and epoxy compound; and the like.

Examples of the chelate compound are, for instance, aluminium tris(ethylacetoacetate), aluminium tris(acetylacetonate), zirconium tetrakis(acetylacetonate), bis(ethylacetoacetate)titanium diisopropoxide and the like.

The curing catalyst may be used alone or in combination of two or more. Preferable curing catalysts are an organotin compound and aluminium chelate compound.

In the present invention, combination of the resin for paints and the curing agent and/or curing catalyst is not particularly limited. Examples of the preferred combination are those mentioned below.

In case of the acrylic polyol resin or the fluoroolefin copolymer having hydroxyl group and/or carboxyl group, when they contain hydroxyl group, the curing agent is the isocyanate compound, blocked isocyanate compound or melamine resin, and when they contain carboxyl group, the curing agent is the melamine resin or epoxy compound. In these systems, the curing catalyst can be used together.

In case of the acrylic silicon resin, fluorine-containing silicone resin or inorganic material, the curing catalyst may be used.

With respect to mixing amount of the resin for paint and the stain-proofing agent, an amount of the stain-proofing agent is from 0.1 to 50 parts by weight, preferably 1 to 30 parts by weight based on 100 parts by weight of the resin for paints. When the amount is less than 0.1 part by weight, stain-proofing property tends to be lowered, and when the amount exceeds 50 parts by weight, there is a tendency that appearance of a coating film becomes poor and compatibility with the resin is lowered.

In the present invention, an organic solvent can be mixed to the above-mentioned composition for paints.

Examples of the organic solvent are, for instance, hydrocarbon solvent such as xylene, toluene, Solvesso 100, Solvesso 150 or hexane; ester solvent such as methyl acetate, ethyl acetate, butyl acetate, ethylene glycol monomethyl acetate, ethylene glycol monoethyl acetate, ethylene glycol monobutyl acetate, diethylene glycol monomethyl acetate, diethylene glycol monoethyl acetate, diethylene glycol monobutyl acetate, ethylene glycol acetate or diethylene glycol acetate; ether solvent such as dimethyl ether, diethyl ether, dibutyl ether, ethylene glycol monomethyl ether, ethylene glycol monoethyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol monobutyl ether, diethylene glycol dimethyl ether, diethylene glycol diethyl ether, diethylene glycol dibutyl ether or tetrahydrofuran; ketone solvent such as methyl ethyl ketone, methyl isobutyl ketone or acetone; amide solvent such as N,N-dimethylacetamide, N-methylacetamide, acetamide, N,N-dimethylformamide, N,N-diethylformamide or N-methylformamide; sulfonic acid ester solvent such as dimethylsulfoxide; alcohol solvent such as methanol, ethanol, isopropanol, butanol, ethylene glycol, diethylene glycol, polyethylene glycol (degree of polymerization; 3 to 100), $CF_3CH_2OH$, $F(CF_2)_2CH_2OH$, $(CF_3)_2CHOH$, $F(CF_2)_3CH_2OH$, $F(CF_2)_4C_2H_5OH$, $H(CF_2)_2CH_2OH$, $H(CF_2)_3CH_2OH$ or $H(CF_2)_4CH_2OH$; and the like. From the viewpoints of compatibility, appearance of the coating film and storage stability, preferable are alcohol solvents such as lower alcohol and lower fluorine-containing alcohol.

With respect to a mixing amount of the resin for paints and the alcohol solvent, an amount of the alcohol solvent is from 1 to 50 parts by weight based on 100 parts by weight of the resin for paints, preferably from 1 to 25 parts by weight from the viewpoints of curability and appearance of a coating film.

When the curing agent has high reactivity with alcohol like a room temperature curing type isocyanate, the amount of the alcohol solvent is further preferably from 1 to 15 parts by weight, and the preferred alcohol is a secondary or tertiary alcohol.

The composition for paints of the present invention is excellent in solvent solubility, and a formed coating film has high weather resistance and is excellent in stain-proofing property, chemical resistance, optical properties, mechanical properties, adhesion to substrates, resistance to yellowing due to heat, etc. Like usual curing compositions, the composition for paints of the present invention can be applied as paints for indoor use for building materials and interior materials or for outdoor use for building materials, cars, air planes, ships, trains, etc., directly on metals, concrete, plastics or on a primer paint such as wash primer, rust preventive paint, epoxy resin paint, acrylic resin paint and polyester resin paint, and further can be used as a sealing agent and film forming agent.

The above-mentioned composition can be used in various manners, for example, in clear, in solid and in blend with filler.

Various coating methods can be employed, for example, spray coating, brush coating, roller coating, curtain flow and dip coating.

To the composition for paints of the present invention can be added additives for paints, for example, pigment, pigment dispersing agent, thickener, leveling agent, defoaming agent, auxiliary for film forming, ultraviolet ray absorber, HALS, flatting agent, filler, colloidal silica, fungus preventing agent, silane coupling agent, anti-skinning agent, antioxidant, flame retardant, anti-drip agent, anti-static agent, rust preventing agent, water soluble resin (polyvinyl alcohol, polyethylene oxide, etc.) and the like.

Examples of the pigment are, for instance, titanium oxide, iron oxide, aluminium metallic pigment, carbon black, sintered pigment, phthalocyanine pigment, organic pigment, extended pigment and the like.

Examples of the titanium oxide are, for instance, Tipaque CR-90, CR-93, CR-95 and CR-97 available from Ishihara Sangyo Kabushiki Kaisha and the like.

Examples of the iron oxide are, for instance, Todacolor 120ED, 140ED, 160ED, KN-R and KN-V available from Toda Kogyo Kabushiki Kaisha, TAROX LL-XLO, HY-100, HY-200, BL-100 and BL-500 available from Titan Kogyo Kabushiki Kaisha and the like.

Examples of the aluminium metallic pigment are, for instance, Alpaste 0100MA, 0700M, 0200M, 0215M, 1950M, 1900M, 1100M, 1109M, 1200M, 8820YF, 7080N, MG600 and 1700N available from Toyo Aluminium Kabushiki Kaisha and the like.

Examples of the carbon black are, for instance, MA7, MA11, MA100, OIL7B, OIL30B and OIL31B available from Mitsubishi Kagaku Kabushiki Kaisha and the like.

Examples of the sintered pigment are, for instance, Daipyroxide #9510, #9512, #9410 and #9310 available from Dainichi Seika Kabushiki Kaisha and the like.

Examples of the phthalocyanine pigment are, for instance, #5195N and #5370 available from Dainichi Seika Kabushiki Kaisha and the like.

Examples of the extended pigment are, for instance, asbestine, calcium carbonate, precipitated calcium carbonate, clay, kaolin, porcelain clay, aluminium silicate, diatomaceous earth, white carbon, white silica, hydrated fine silica, bentonite, talc, magnesium silicate, magnesium carbonate, baryte powder, barium sulfate, precipitated barium sulfate and the like.

Examples of the pigment dispersing agent are, for instance, those available from BYK Chemie Japan Ltd., such as Anti-Terra-P, Anti-Terra-U, Anti-Terra-203/204, Disperbyk, Disperbyk-101, Disperbyk-110, Disperbykl30, Disperbyk161, Disperbyk-164, Disperbyk-170, Bykumen, BYK-P104/P105, BYK-104S, BYK-240S and Lactimon and the like.

Examples of the leveling agent are, for instance, those available from BYK Chemie Japan Ltd., such as BYK-300, BYK-302, BYK-306, BYK-307, BYK-335, BYK-310, BYK-320, BYK-322, BYK-323, BYK-324, BYK-325, BYK-330, BYK-331, BYK-333, BYK-344, BYK-370, BYK-354, BYK-355 and BYK-358 and the like.

Examples of the thickener are, for instance, Disparlon #6900-20X, #6900-10S, #4200-20 and #4200-10 available from Kusumoto Kasei Kabushiki Kaisha, Bentone SD-1, SD-2, SD-3, #27, #34, #38 and MPA-2000X available from NL Chemicals Kabushiki Kaisha and the like.

Examples of the defoaming agent are, for instance, those available from BYK Chemie Japan Ltd., such as BYK-051, BYK-052, BYK-053, BYK-055, BYK-057, BYK-065, BYK-066, BYK-070, BYK-077, BYK-080, BYK-088, BYK-141 and the like.

Examples of the suitable ultraviolet ray absorber are, for instance, those of benzophenone type and benzotriazole type. Among them, effective benzophenone type absorbers are 2,2'-dihydroxy-4,4'-dimethoxybenzophenone, 2,2'-dihydroxy-4,-methoxybenzophenone and 2,2,4,4'-tetrahydroxybenzophenone, and effective benzotriazole type absorbers are 2-(2-hydroxy-5'-methylphenyl)benzotriazole, 2-(2-hydroxy-5'-methylphenyl)-5,6-dichlorobenzotriazole, 2-(2'-hydroxy5'-tert-butylphenyl)benzotriazole, 2-(2'-hydroxy-3',5'-di-tert-butylphenyl)-5-chlorobenzotriazole, 2-(2'-hydroxy-5-phenylphenyl)-5-chlorobenzotriazole, 2-(2'-hydroxy-3'-tert-butylphenyl)-5-chlorobenzotriazole, 2-(2'-hydroxy-3,5'-di-tert-butylphenyl)benzotriazole and 2-(2'-hydroxy-5'-tert-octylphenyl)benzotriazole.

Particularly suitable ultraviolet ray absorbers are those represented by the formula (11):

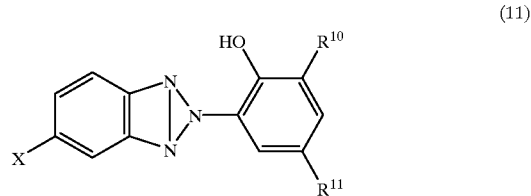

(11)

wherein $R^{10}$ and $R^{11}$ are the same or different, and each is hydrogen atom, a lower alkyl group, particularly a branched lower alkyl group or an aryl, particularly phenyl, X is hydrogen atom or a halogen atom, particularly chlorine atom.

Examples of HALS are, for instance, Tinuvin-770, 292, 622123 and 440 available from Ciba Geigy and the like.

Examples of the flatting agent are, for instance, Selidast #3620, #9615A, #9612A, #3715 and #3910, Hoechst Wax PE520 and white carbon which are available from Hoechst Industries Co., Ltd., and the like.

Examples of the silane coupling agent are, for instance, methyltrimethoxysilane, ethyltriethoxysilane, dimethyldimethoxysilane, trimethylmethoxysilane, vinyltrimethoxysilane, 3-(glycidyloxy) propyltrimethoxysilane, N-(2-aminoethyl)-3-aminopropyltrimethoxysilane, 3-aminopropyltrimethoxysilane, 3-aminopropyltriethoxysilane, 3-mercaptopropyltrimethoxysilane, 3-trimethoxysilylpropylisocyanate, 3-triethoxysilylpropylisocyanate, methyltris (ethylmethylketoxime)silane and the like. Preferred silane coupling agents are those having alkylketoxime group or isocyanate group.

The composition for paints of the present invention can be applied to various substrates. Examples of the substrate are, for instance, those made of metal, cement, plastic, etc.

Examples of the metal substrate are, for instance, iron and chemically treated or plated iron, aluminium and chemically treated aluminium, stainless steel and chemically treated stainless steel and the like.

Examples of the cement substrate are, for instance, cement, lime, gypsum, concrete, cement mortar, asbestos slate, gypsum board and the like.

Examples of the plastic substrate are, for instance, polyvinyl chloride, polyester, polycarbonate, acryl, polyolefin, polystirene, polyurethane, polyamide, nylon, natural rubber, urethane rubber, ABS resin and the like.

In case of the metal substrate, it is preferable from the viewpoints of corrosion resistance and intercoat adhesion that the composition for paints of the present invention is applied after under coating and intermediate coating as mentioned below.

As the under coat paint, a zinc rich paint is preferred.

Examples of a vehicle for organic zinc rich paint are, for instance, chlorinated rubber, polystirene resin, silicone resin, combination of epoxy resin-polyamide resin and the like. Examples of a vehicle for inorganic zinc rich paint are, for instance, ethyl silicate, sodium silicate, lithium silicate, potassium silicate, ammonium silicate and the like. The vehicles particularly preferred for the purposes of the present invention are combination of epoxy resin-polyamide resin, ethyl silicate, potassium silicate and lithium silicate.

Examples of other preferred under coat paints and intermediate coat paints are paints obtained by adding a usually employed coloring pigment, extended pigment, antisettling agent, dispersing agent, curing agent, curing accelerator, thinner, solvent, etc. to at least one synthetic resin selected from epoxy resin (including tar- or urethane-modified one), vinyl resin (including tar-modified resin and acrylic resin), chlorinated resin, polyurethane resin and phenol resin, and then kneading.

The above-mentioned epoxy resin is a resin which has two or more epoxy groups in its molecule and is used usually for paints.

As the epoxy resin, there can be cited, for example, bisphenol epoxy resin such as commercially available Epikote 828, 834, 836, 1001, 1004 and DX-255 which are trade names of Shell Kagaku Kabushiki Kaisha, Araldite GY-260 which is trade name of Ciba Geigy, DER 330, 331 and 337 which are trade names of Dow Chemical or Epiclon 800 which is trade name of Dai Nippon Ink Kagaku Kogyo Kabushiki Kaisha; phenol-novolac epoxy resin such as commercially available DEN 431 and 438 which are trade names of Dow Chemical; polyglycol epoxy resin such as commercially available Araldite CT-508 which is trade name of Ciba Geigy or DER-732 and 736 which are trade names of Dow Chemical; ester epoxy resin such as Epiclon 200 and 400 which are trade names of Dai Nippon Ink Kagaku Kogyo Kabushiki Kaisha; and linear aliphatic epoxy resin such as an epoxidated polybutadiene like BF-1000 which is trade name of Nippon Soda Kabushiki Kaisha.

Epoxy compounds easily analogized from the above-mentioned epoxy resin and derivatives of the epoxy resin are also usable similarly and are encompassed within the technical scope of the present invention.

For example, polyol epoxy resin, alicyclic epoxy resin, halogen-containing epoxy resin and the like are encompassed therein.

To the epoxy resin can be mixed bituminous materials such as mineral bitumen, asphaltite, asphaltic pyrobitumen, tar, coal tar, artificial asphalt and pitch.

As the curing agent for the epoxy resin, there can be used those usually used for paints, such as amine adduct and polyamide resin.

As the curing agent, there are cited, for instance, polyamide resins such as commercially available Tohmide Y-25, 245, 2400 and 2500 which are trade names of Fuji Kasei Kogyo Kabushiki Kaisha, Zenamide 2000 and Versamide 115 and 125 which are trade names of Dai-ichi General Kabushiki Kaisha, Sunmide 320, 330 and X2000 which are trade names of Sanwa Kagaku Kabushiki Kaisha, and Epicure 3255 and 4255 which are trade names of Shell Kagaku Kabushiki Kaisha; amine adducts such as Tohmide 238 and Fujicure 202 which are trade names of Fuji Kagaku Kogyo Kabushiki Kaisha and Adeca Hardener EH-531 which is trade name of Asahi Denka Kabushiki Kaisha; aliphatic polyamines such as Sunmide T-100, D-100 and P-100 which are trade names of Sanwa Kagaku Kabushiki Kaisha; and heterocyclic diamine derivatives such as Epomate B-002, C-002 and S-005 available from Ajinomoto Kabushiki Kaisha.

An adding amount of the curing agent is about an equivalent to the epoxy resin, namely in the range of about 0.7 to about 1.3 equivalents to 1 equivalent of the epoxy resin.

As the curing agent for the epoxy resin, polyisocyanate can also be used.

Examples of the vinyl resins used in the present invention are, for instance, copolymer comprising one or more of monomers such as vinyl chloride, vinylidene chloride, vinyl acetate, vinyl propionate, stirene, vinyltoluene, vinyl alcohol, acrylic acid, methacrylic acid, maleic anhydride, alkyl acrylate and alkyl methacrylate. Examples thereof are vinyl chloride resin, vinyl chloride-vinyl acetate copolymer resin, acrylic resin and the like.

A chlorinated rubber resin used in the present invention is chlorinated natural rubber which is a compound containing usually 65 to 68% of chlorine.

The chlorinated rubber can be used in the mixture with rosin, coumarone-indene resin, phenol resin, vinyl chloride resin, petroleum resin, nitrile rubber, chloroprene rubber or alkyd resin.

The chlorinated rubber can also be used in the mixture with plasticizer such as chlorinated paraffin, diphenyl chloride, dioctyl phthalate or tricresyl phosphate.

The polyurethane resin used in the present invention is a composition comprising, as a main component, a compound having two or more active hydrogens in its molecule such as polyester polyol, polyether polyol, polyoxyalkylene glycol or acrylic polyol which is obtained from polybasic acid and polyol, and the above-mentioned curing agent, i.e. polyisocyanate having two or more isocyanate groups in its molecule.

When the substrate is the cement substrate, it is preferable that the composition for paints of the present invention is applied on an under coating and intermediate coating as mentioned below.

As the under coat paint, it is particularly preferable to use multi-layer finish paints such as multi-layer finish paint of non-curable synthetic resin emulsion, multi-layer pattern finish paint of reaction-curable aqueous epoxy resin and multi-layer finish paint of reaction-curable solvent-based epoxy resin. The resin component of the non-curable synthetic resin emulsion includes, for example, acrylic resin, vinyl acetate resin and modified resins thereof. Also the curing system of the reaction-curable aqueous or solvent-based epoxy resin includes, for example, epoxy-polyamine, epoxy-polyamide, epoxy-polyaminepolyamide and the like.

The under coat paint on the cement substrate can be applied by, for example, spray coating method, roller coating method, etc. It appears that a sufficient applying amount is usually from 0.5 to 2.0 kg/m$^2$. In general, drying is carried out usually for 1 to 3 days.

Before applying the under coat paint to the cement substrate, known primer, surface sealer or the like which has been used in general for surface preparation for building can be applied previously. In addition to the above-mentioned under coat paint, the present invention includes direct coating of a sealer of solvent-based epoxy resin or coating of the sealer and then smooth-finishing with isocyanate curing resin paint, etc.

The composition for paints of the present invention can be applied to the under coating film by, for example, roller coating method, brush coating method, spray coating method, etc. An applying amount is from 0.05 to 0.5 kg/m$^2$, preferably from 0.1 to 0.3 kg/m$^2$. A cured coating film can be formed by drying at normal temperature for at least one day.

A repair coating method comprises, for example, applying the composition for paints of the present invention after necessary surface preparation of the existing top coating film on the cement substrate for exterior of buildings.

In the above method, the existing top coating is not particularly limited. The particularly preferred top coating film is one formed by using paints as used for the composition of the present invention, i.e. a non-crosslinkable solvent-based paint such as curable fluorine-containing paint, curable acrylic paint, acrylic silicon paint, carbonyl-hydrazide curable aqueous paint or vinyl acetate-modified acrylic resin paint and a non-crosslinkable aqueous paint such as acrylic resin aqueous paint.

Examples of the carbonyl-hydrazide curable aqueous paint are ones prepared by mixing a water dispersion of a carbonyl-containing copolymer with a hydrazide crosslinking agent and an aqueous polyurethane resin having hydrazine residue (for example, Japanese Patent Application No. 4-171683). Between the existing top coating and the cement substrate may have been applied a primer and surfacer or thereon may have been applied multi-layer paints.

The surface preparation to be made, if occasion demands, on the existing top coating can be carried out, for example, by applying a surface treating agent mentioned below. Examples of the preferred surface treating agent are, for instance, a cement type filler or surfacer (for example, cement/synthetic resin emulsion, etc.), reaction-curable resin permeable sealer (for example, epoxy polyamine, epoxy polyamide, etc.), and the like.

The surface preparation can be carried out by applying the surface treating agent by means of, for example, roller, brush, etc. An applying amount of the surface treating agent is, for example, from 0.3 to 2.0 kg/m$^2$ in case of the filler, from 0.1 to 1.0 kg/m$^2$ in case of the surfacer and from 0.01 to 0.5 kg/m$^2$ in case of the permeable sealer.

After the application of the surface treating agent, a polyisocyanate curable solvent-based paint can be further applied by means of, for example, roller coating method, brush coating method or spray coating method. It appears that a sufficient applying amount is from 0.05 to 0.5 kg/m$^2$. The drying of the surface treating agent and polyisocyanate curable solvent-based paint is carried out 1 to 3 times. The application and drying of the composition for paints of the present invention can be carried out in the same manner as mentioned above.

Also in case of the plastic substrate, the composition for paints of the present invention can be applied after the application of the under coating and intermediate coating as used in the metal substrate and cement substrate.

Among the plastic substrates, in case of a plastic film and sheet, there are applying methods, for example, gravure roll coating, doctor blade coating, roll coating, reverse roll coating, air knife coating, etc. In those applying methods, a suitable coating thickness is from 1 to 20 $\mu$m, preferably from 1 to 10 $\mu$m from the viewpoints of appearance of a coating film and coatability.

Examples of uses of articles coated with the composition for paints of the present invention are, for instance, water-proof sheet for building, water-proof sheet for tunnel, polyvinyl sheet for agriculture, polyvinyl film for agriculture, covering sheet, protection sheet for building, protection sheet for train, mesh sheet, mesh screen, polycarbonate roof, acryl board wall, polycarbonate wall, guardrail, traffic signal, inner wall of tunnel, inner plate for tunnel, road sign, guidance plate, side wall of highway, sound-isolation wall for highway, road light, bridge beam, bridge girder, bridge pier, chimney, wall paper, tatami-mat, floor mat, table cloth, ventilation fan, marking film, geo-membrane, advertisement board, mail box, electric-light pole, tent, car, airplane, ship, train, and the like.

In the composition for paints of the present invention, mentioned below are preferable combinations of (A) any of the above-mentioned stain-proofing agents, (B) the resin for paints and (C) the curing agent and/or curing catalyst. In any of the combinations, previous mixing of the components (A) and (C) is good for preparing a two-component paint. In case where the resin for paints is an acrylic silicon resin or inorganic material, it is good for preparing a one-component paint.

(1)
(A1) Organometallic compound represented by the formula (1), wherein at least one of R$^1$ and R$^2$ is a group containing fluorine atom, particularly b=1 to 5, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts
A coating film obtained from this composition is excellent in stain-proofing property and weather resistance. More preferable combination is:

(A2) Oligomer or cooligomer of an organometallic compound represented by the formula (1), wherein at least one of R$^1$ and R$^2$ is a group containing fluorine atom, particularly b=1 to 5, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts A coating film obtained from this composition is excellent in stain-proofing property and weather resistance both at initial stage of coating and with lapse of time. Further preferable combination is:

(A3) Cooligomer of an organometallic compound represented by the formula (1), wherein at least one of R$^1$ and $R^2$ is a group containing fluorine atom, M comprises at least two metals, particularly b=1 to 5, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in curability and a coating film obtained therefrom is excellent in stain-proofing property both at initial stage of coating and with lapse of time, weather resistance, flexibility and hardness.

(2)

(A1) Organometallic compound represented by the formula (1), wherein at least one of $R^1$ and $R^2$ is a group containing fluorine atom, particularly b=1 to 5, M is B, Al, Ti, Zr or Si, at least one of X is a polymer chain 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and a coating film obtained therefrom is excellent in stain-proofing property and weather resistance. More preferable combination is:

(A2) Oligomer or cooligomer of an organometallic compound represented by the formula (1), wherein at least one of $R^1$ and $R^2$ is a group containing fluorine atom, particularly b=1 to 5, M is B, Al, Ti, Zr or Si, at least one of X is a polymer chain 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and a coating film obtained therefrom is excellent in stain-proofing property both at initial stage of coating and with lapse of time and weather resistance. Further preferable combination is:

(A3) Cooligomer of an organometallic compound represented by the formula (1), wherein at least one of $R^1$ and $R^2$ is a group containing fluorine atom, M comprises at least two metals, particularly b=1 to 5, M is B, Al, Ti, Zr or Si, at least one of X is a polymer chain 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and curability and a coating film obtained therefrom is excellent in stain-proofing property both at initial stage of coating and with lapse of time, weather resistance, flexibility and hardness.

(3)

(A1) Organometallic compound represented by the formula (1), wherein at least one of $R^1$ and $R^2$ is a group containing fluorine atom, particularly b=1 to 5, M is B, Al, Ti, Zr or Si, at least one of X is a group having a functional group 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and a coating film obtained therefrom is excellent in stain-proofing property, weather resistance and appearance. More preferable combination is:

(A2) Oligomer or cooligomer of an organometallic compound represented by the formula (1), wherein at least one of $R^1$ and $R^2$ is a group containing fluorine atom, particularly b=1 to 5, M is B, Al, Ti, Zr or Si, at least one of X is a group having a functional group 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and a coating film obtained therefrom is excellent in stain-proofing property both at initial stage of coating and with lapse of time, weather resistance and appearance. Further preferable combination is:

(A3) Cooligomer of an organometallic compound represented by the formula (1), wherein at least one of $R^1$ and $R^2$ is a group containing fluorine atom, M comprises at least two metals, particularly b=1 to 5, M is B, Al, Ti, Zr or Si, at least one of X is a group having a functional group 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in compatibility and curability and a coating film obtained therefrom is excellent in stain-proofing property both at initial stage of coating and with lapse of time, weather resistance, flexibility, hardness and appearance.

(4)

(A1) Organometallic compound represented by the formula (1), wherein at least one of $R^1$ and $R^2$ is a group containing fluorine atom, particularly b=0, M is B, Al, Ti, Zr or Si, 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts A coating film obtained from this composition is excellent in hydrophilization of its surface, stain-proofing property and weather resistance. More preferable combination is:

(A2) Oligomer or cooligomer of an organometallic compound represented by the formula (1), wherein at least one of $R^1$ and $R^2$ is a group containing fluorine atom, particularly b=0, M is B, Al, Ti, Zr or Si 1 to 100 parts (B2) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts A coating film obtained from this composition is excellent in hydrophilization of its surface and stain-proofing property both at the initial stage of coating and with lapse of time and weather resistance. Further preferable combination is:

(A3) Cooligomer of an organometallic compound represented by the formula (1), wherein at least one of $R^1$ and $R^2$ is a group containing fluorine atom, M comprises at least two metals, particularly b=0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in curability and a coating film obtained therefrom is excellent in hydrophilization of its surface and stain-proofing property both at the initial stage of coating and with lapse of time, weather resistance, flexibility and hardness. Particularly preferable combination is;

(A4) Cooligomer of an organometallic compound represented by the formula (1), wherein at least one of $R^1$ and $R^2$ is a group containing fluorine atom, M comprises at least two metals, particularly b=0, M is Si or Ti 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in curability and good from the viewpoints of availability of materials and easy preparation, and a coating film obtained therefrom is excellent in hydrophilization of its surface and stain-proofing property both at the initial stage of coating and with lapse of time, weather resistance, flexibility and hardness.

(5)

(A1) Cooligomer of an organometallic compound represented by the formula (1), wherein at least one of $R^1$ and $R^2$ is a group containing fluorine atom, particularly b=1 to 5, M is B, Al, Ti, Zr or Si and an organometallic compound represented by the formula (1), wherein particularly b=0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating and a coating film obtained therefrom is excellent in stain-proofing property both at the initial stage of coating and with lapse of time and weather resistance. More preferable combination is:

(A2) Cooligomer of an organometallic compound represented by the formula (1), wherein at least one of $R^1$ and $R^2$ is a group containing fluorine atom, M comprises at least two metals, particularly b=1 to 5, M is B, Al, Ti, Zr or Si and an organometallic compound represented by the formula (1), wherein particularly b=0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating and curability, and a coating film obtained therefrom is excellent in stain-proofing property both at the initial stage of coating and with lapse of time, weather resistance, flexibility and hardness. Further preferable combination is:

(A3) Cooligomer of an organometallic compound represented by the formula (1), wherein at least one of $R^1$ and $R^2$ is a group containing fluorine atom, particularly b=1, M is Si and an organometallic compound represented by the formula (1), wherein particularly b=0, M is Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating and good from the viewpoints of availability of materials and easy preparation, and a coating film obtained therefrom is excellent in stain-proofing property both at the initial stage of coating and with lapse of time and weather resistance.

(6)

(A1) Cooligomer of an organometallic compound represented by the formula (1), wherein at least one of RI and $R^2$ is a group containing fluorine atom, particularly b=1 to 5, M is B, Al, Ti, Zr or Si, at least one of X is a group having a functional group and an organometallic compound represented by the formula (1), wherein particularly b=0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, antifoaming property, floating resistance and compatibility, and a coating film obtained therefrom is excellent in stain-proofing property both at the initial stage of coating and with lapse of time, weather resistance, appearance and recoatability. More preferable combination is:

(A2) Cooligomer of an organometallic compound represented by the formula (1), wherein at least one of RI and $R^2$ is a group containing fluorine atom, M comprises at least two metals, particularly b=1 to 5, M is B, Al, Ti, Zr or Si, at least one of X is a group having a functional group and an organometallic compound represented by the formula (1), wherein particularly b=0, M is B, Al, Ti, Zr or SiX 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, antifoaming property, floating resistance, compatibility and curability, and a coating film obtained therefrom is excellent in stain-proofing property both at the initial stage of coating and with lapse of time, weather resistance, flexibility, hardness, appearance and recoatability. Further preferable combination is:

(A3) Cooligomer of an organometallic compound represented by the formula (1), wherein at least one of $R^1$ and $R^2$ is a group containing fluorine atom, particularly b=1, M is Si, X is a group having a functional group and an organometallic compound represented by the formula (1), wherein particularly b=0, M is Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, antifoaming property, floating resistance and compatibility and good from the viewpoints of availability of materials and easy preparation, and a coating film obtained therefrom is excellent in stain-proofing property both at the initial stage of coating and with lapse of time, weather resistance, appearance and recoatability.

(7)
(A1) Organometallic compound represented by the formula (1), wherein at least one of $R^1$ and $R^2$ is a group containing fluorine atom, particularly b=0, c>0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in storage stability and pot life, and a coating film obtained therefrom is excellent in hydrophilization of its surface, stain-proofing property and weather resistance. More preferable combination is:

(A2) Oligomer or cooligomer of an organometallic compound represented by the formula (1), wherein at least one of $R^1$ and $R^2$ is a group containing fluorine atom, particularly b=0, c>0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in storage stability and pot life, and a coating film obtained therefrom is excellent in hydrophilization of its surface and stain-proofing property both at the initial stage of coating and with lapse of time and weather resistance. Further preferable combination is:

(A3) Cooligomer of an organometallic compound represented by the formula (1), wherein at least one of $R^1$ and $R^2$ is a group containing fluorine atom, M comprises at least two metals, particularly b=0, c >0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in curability, storage stability and pot life, and a coating film obtained therefrom is excellent in hydrophilization of its surface and stain-proofing property both at initial stage of coating and with lapse of time, weather resistance, flexibility and hardness. Particularly preferable combination is;

(A4) Cooligomer of an organometallic compound represented by the formula (1), wherein at least one of $R^1$ and $R^2$ is a group containing fluorine atom, M comprises at least two metals, particularly b=0, c >0, M is Ti and Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in curability, storage stability and pot life and good from the viewpoints of availability of materials and easy preparation, and a coating film obtained therefrom is excellent in hydrophilization of its surface and stain-proofing property both at the initial stage of coating and with lapse of time, weather resistance, flexibility and hardness.

(8)
(A1) Cooligomer of an organometallic compound represented by the formula (1), wherein at least one of $R^1$ and $R^2$ is a group containing fluorine atom, particularly b=1 to 5, M is B, Al, Ti, Zr or Si and an organometallic compound represented by the formula (1), wherein particularly b=0, c >0, M is B, Al, Ti, Zr or Si 1 to 10 0 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, storage stability and pot life, and a coating film obtained therefrom is excellent in stain-proofing property both at initial stage of coating and with lapse of time and weather resistance. More preferable combination is:

(A2) Cooligomer of an organometallic compound represented by the formula (1), wherein at least one of $R^1$ and $R^2$ is a group containing fluorine atom, M comprises at least two metals, particularly b=1 to 5, M is B, Al, Ti, Zr or Si and an organometallic compound represented by the formula (1), wherein particularly b=0, c >0, M is B, Al, Ti, Zr or Si 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, curability, storage stability and pot life, and a coating film obtained therefrom is excellent in stain-proofing property both at the initial stage of coating and with lapse of time, weather resistance, flexibility and hardness. Further preferable combination is:

(A3) Cooligomer of an organometallic compound represented by the formula (1), wherein at least one of $R^1$ and $R^2$ is a group containing fluorine atom, M comprises at least two metals, particularly b=1, M is Si and an organometallic compound represented by the formula (1), wherein particularly b=0, c >0, M is Ti or Al 1 to 100 parts (B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts (C) Curing agent and/or curing catalyst 0.001 to 100 parts This composition is excellent in workability in coating, curability, storage stability and pot life and good from the viewpoints of availability of materials and easy preparation, and a coating film obtained therefrom is excellent in stain-proofing property both at initial stage of coating and with lapse of time, weather resistance, flexibility and hardness.

(9)
(A1) Cooligomer of an organometallic compound represented by the formula (1), wherein at least one of $R^1$ and $R^2$ is a group containing fluorine atom, particularly b=1 to 5, M is B, Al, Ti, Zr or Si, at least one of X is a group having a functional group and an organometallic compound represented by the formula (1), wherein particularly b=0, c >0, M is B, Al, Ti, Zr or Si 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
This composition is excellent in workability in coating, antifoaming property, floating resistance, compatibility, storage stability and pot life, and a coating film obtained therefrom is excellent in stain-proofing property both at the initial stage of coating and with lapse of time, weather resistance, appearance and recoatability. More preferable combination is:
(A2) Cooligomer of an organometallic compound represented by the formula (1), wherein at least one of $R^1$ and $R^2$ is a group containing fluorine atom, M comprises at least two metals, particularly b=1 to 5, M is B, Al, Ti, Zr or Si, at least one of X is a group having a functional group and an organometallic compound represented by the formula (1), wherein particularly b 0, c >0, M is B, Al, Ti, Zr or Si 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
This composition is excellent in workability in coating, antifoaming property, floating resistance, compatibility, curability, storage stability and pot life, and a coating film obtained therefrom is excellent in stain-proofing property both at the initial stage of coating and with lapse of time, weather resistance flexibility, hardness, appearance and recoatability. Further preferable combination is:
(A3) Cooligomer of an organometallic compound represented by the formula (1), wherein at least one of $R^1$ and $R^2$ is a group containing fluorine atom, M comprises at least two metals, particularly b=1, M is Si, X is a group having a functional group and an organometallic compound represented by the formula (1), wherein particularly b=0, c >0, M is Al or Ti 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
This composition is excellent in workability in coating, antifoaming property, floating resistance, compatibility, curability, storage stability and pot life and good from the viewpoints of availability of materials and easy preparation, and a coating film obtained therefrom is excellent in stain-proofing property both at the initial stage of coating and with lapse of time, weather resistance, flexibility, hardness, appearance and recoatability.
(10)
(A1) Oligomer or cooligomer of an organometallic compound represented by the formula (1), wherein at least one of $R^1$ is a group containing fluorine atom, particularly a=4, b=c=0, M is Si (degree of polymerization of each of the oligomer and cooligomer is more than 20 and not more than 100 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
A coating film obtained from this composition is excellent in stain-proofing property and weather resistance. More preferable combination is: (A2) Oligomer or cooligomer of an organometallic compound represented by the formula (1), wherein at least one of $R^1$ is a group containing fluorine atom, particularly a=4, b=c=0, M is Si (degree of polymerization of each of the oligomer and cooligomer is more than 20 and not more than 100) 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
A coating film obtained from this composition is excellent in stain-proofing property both at the initial stage of coating and with lapse of time, appearance and weather resistance. Further preferable combination is:
(A3) Cooligomer of an organometallic compound represented by the formula (1), wherein at least one of $R^1$ is a group containing fluorine atom, particularly a=4, b=c=0, M is Si (degree of polymerization is more than 20 and not more than 100) 1 to 100 parts
(B1) Fluoroolefin copolymer having hydroxyl group and/or carboxyl group, acrylic silicon resin, inorganic material or homopolymer or copolymer of vinylidene fluoride containing no functional group, which is solvent-soluble 100 parts
(C) Curing agent and/or curing catalyst 0.001 to 100 parts
This composition is excellent in curability, and a coating film obtained therefrom is excellent in stain-proofing property both at the initial stage of coating and with lapse of time, alkali resistance, appearance, antisagging property, weather resistance, flexibility and hardness.

EXAMPLE

The present invention is then explained concretely by means of Examples, and is not limited thereto.

PREPARATION EXAMPLE 1

A 3-liter three neck flask made of glass was charged with 136 g of methyltrimethoxysilane, 1,872 g of $Si(OCH_2CF_2CF_3)_4$ and 1,000 g of tetrahydrofuran, and with stirring sufficiently, thereto was added dropwise a mixture of 51.5 g of water, 3.94 g of a 37% hydrochloric acid and 500 g of tetrahydrofuran at room temperature for 30 minutes. The obtained mixture was heated and stirred at 67° C. for three hours, and then heated upto 100° C. to distill off volatile components. Lastly a pressure inside the flask was reduced, and the atmosphere inside the flask was replaced with nitrogen gas. Then a liquid product (cooligomer) was taken out of the flask (yield: 1,200 g).

PREPARATION EXAMPLE 2

A 3-liter three neck flask made of glass was charged with 230 g of $B(OC_4H_9)_3$, 1,872 g of $Si(OCH_2CF_2CF_3)_4$ and 1,000 g of tetrahydrofuran, and with stirring sufficiently, thereto was added dropwise a mixture of 51.5 g of water, 3.94 g of a 37% hydrochloric acid and 500 g of tetrahydrofuran at room temperature for 30 minutes. The obtained mixture was heated and stirred at 67° C. for three hours, and then heated upto 100° C. to distill off volatile components. Lastly a pressure inside the flask was reduced, and the atmosphere inside the flask was replaced with nitrogen gas. Then a liquid product (cooligomer) was taken out of the flask (yield: 1,280 g).

PREPARATION EXAMPLE 3

A 2-liter four neck flask made of glass and equipped with a stirrer, ten-staged rectification column, dropping funnel and thermometer was charged with 63.9 g of methyltrimethoxysilane, 500 g of $Si(OCH_3)_4$ and 300 g of :methanol, and with stirring sufficiently, thereto was added dropwise a mixture of 59.0 g of water, 0.392 g of a 35% hydrochloric acid and 200 g of methanol at room temperature for 30 minutes. The obtained mixture was then subjected to heating and refluxing over three hours with stirring, and then heated upto 100° C. to distill off volatile components. Lastly a pressure inside the flask was reduced, and the atmosphere inside the flask was replaced with nitrogen gas. Then to the reaction mixture was added dropwise a mixture of 1,191 g of $CF_3CF_2CH_2OH$ and 0.184 g of sulfuric acid over 10 minutes, followed by heating and refluxing over one hour with further stirring. Then volatile components were distilled off over 10 hours by using the rectification column. Lastly heating (100° C.), pressure reduction (300 mmHg) and replacing with nitrogen gas were carried out to give a liquid product (cooligomer comprising hexamer to decamer as main components) (yield: 781 g). To the crude product was added 40 g of Kyowaad 500 ($Mg_6A_{12}$ $(OH)_{16}CO_3.4H_2O$ available from Kyowa Kagaku Kogyo Kabushiki Kaisha), followed by stirring at 80° C. for one hour and then filtrating through a PTFE membrane filter (diameter of opening: 3.0 μm) to give a purified product.

PREPARATION EXAMPLE 4

A 3-liter four neck flask made of glass and equipped with a stirrer, 5-staged rectification column, dropping funnel and thermometer was charged with 72.6 g of methyltrimethoxysilane, 1,000 g of $Si(OC_2H_5)_4$ and 500 g of ethanol, and with stirring sufficiently, thereto was added dropwise a mixture of 74.4 g of water, 5.56 g of a 35% hydrochloric acid and 500 g of ethanol at room temperature for 30 minutes. The obtained mixture was then subjected to heating and refluxing over three hours with stirring, and heated upto 100° C. to distill off volatile components. Lastly a pressure inside the flask was reduced, and the atmosphere inside the flask was replaced with nitrogen gas. Then to the reaction mixture was added dropwise a mixture of 704 g of $HCF_2CF_2CH_2OH$ and 0.131 g of sulfuric acid over 10 minutes, followed by heating and refluxing over one hour with further stirring. Then volatile components were distilled off over 10 hours by using the rectification column. Lastly heating (100° C.), pressure reduction (300 mmHg) and replacing with nitrogen gas were carried out to give a liquid product (cooligomer comprising decamer to eicosamer as main components) (yield: 1,160 g). To the crude product was added 55 g of Kyowaad 500, followed by stirring at 80° C. for one hour and then filtrating through a PTFE membrane filter (diameter of opening: 3.0 μm) to give a purified product.

PREPARATION EXAMPLE 5

A 3-liter four neck flask made of glass and equipped with a stirrer, 5-staged rectification column, dropping funnel and thermometer was charged with 72.6 g of methyltrimethoxysilane, 1,000 g of $Si(OC_2H_5)_4$ and 500 g of ethanol, and with stirring sufficiently, thereto was added dropwise a mixture of 74.4 g of water, 5.56 g of a 35% hydrochloric acid and 500 g of ethanol at room temperature for 30 minutes. The obtained mixture was then subjected to heating and refluxing over three hours with stirring, and heated upto 150° C. to distill off volatile components. Lastly a pressure inside the flask was reduced, and the atmosphere inside the flask was replaced with nitrogen gas. Then to the reaction mixture was added dropwise a mixture of 866 g of $H(CF_2)_4CH_2OH$ and 25.8 g of 2-butanone oxime over 10 minutes, followed by heating and refluxing over one hour with further stirring. Then volatile components were distilled off over five hours by using the rectification column. Lastly heating (100° C.), pressure reduction (300 mmHg) and replacing with nitrogen gas were carried out to give a liquid product (cooligomer comprising decamer to eicosamer as main components) (yield: 824 g).

PREPARATION EXAMPLE 6

A 3-liter four neck flask made of glass and equipped with a stirrer, 10-staged rectification column, dropping funnel and thermometer was charged with 1,000 g of DC3037 (methyl group- and phenyl group-containing organopolysiloxane available from Toray Dow Corning Silicone Kabushiki Kaisha), 500 g of SR2404 (methyl-containing organopolysiloxane available from Toray Dow Corning Silicone Kabushiki Kaisha) and 1,000 g of $HCF_2CF_2CH_2OH$. The obtained mixture was then subjected to heating and refluxing over one hour with stirring, and then volatile components were distilled off over 5 hours by using the rectification column. Lastly heating (100° C.), pressure reduction (300 mmHg) and replacing with nitrogen gas were carried out to give a liquid product (yield: 1,880 g).

PREPARATION EXAMPLE 7

A 3-liter four neck flask made of glass and equipped with a stirrer, rectification column, dropping funnel and thermometer was charged with 1,000 g of Methyl Silicate 56 (methyl silicate oligomer available from Mitsubishi Kagaku Kabushiki Kaisha), 192 g of Hokuko HZ-OB (zirconium tetrabutoxide available from Hokko Kagaku Kogyo Kabushiki Kaisha) and 1,000 g of $H(CF_2)_4CH_2OH$. The obtained mixture was then subjected to heating and refluxing over one hour with stirring sufficiently, and then volatile components were distilled off over 3 hours. Lastly heating (100° C.), pressure reduction (300 mmHg) and replacing with nitrogen gas were carried out to give a liquid product (cooligomer comprising decamer to eicosamer as main components) (yield: 1,560 g).

PREPARATION EXAMPLE 8

A 5-liter four neck flask made of glass and equipped with a stirrer, rectification column, dropping funnel and thermometer was charged with 500 g of Methyl Silicate 51 (tetramer available from Colcoat Co., Ltd.) and then 0.42 g of sulfuric acid, followed by stirring sufficiently. The mixture was heated to 80° C., and thereto was added dropwise a mixture of 16.7 g of water and 4,470 g of 2,2,3,3,3-pentafluoropropanol over 30 minutes. Further the reaction mixture was subjected to refluxing for one hour, volatile components were distilled at 80° to 120° C. and lastly a pressure was reduced to 150 mmHg to distill off the volatile components and give a crude product (yield: 821 g, comprising, as a main component, a cooligomer having a degree of polymerization of 20 to 50). Then a column was charged with 300 ml of Diaion WA-21 (anionic exchange resin available from Mitsubishi Kagaku Kabushiki Kaisha), and rinsed with 1,000 ml of methanol and then with 300 ml of 2,2,3,3,3-pentafluoropropanol. The product was passed through the column for deacidification.

PREPARATION EXAMPLE 9

A 2-liter four neck flask made of glass and equipped with a stirrer, rectification column, dropping funnel and thermometer was charged with 5.0 g of methyltrimethxoysilane, 500 g of Methyl Silicate 51 (methyl silicate tetramer available from Colcoat Co., Ltd.) and 1.10 g of triethylamine, followed by heating to 80° C. with stirring sufficiently. To the mixture was added dropwise 1,191 g of 2,2,3,3,3-pentafluoropropanol over 30 minutes. Further the mixture was subjected to heating and refluxing for one hour with stirring, and then heated to 120° C. to distill off volatile components. Lastly a pressure inside the flask was reduced and the atmosphere inside the flask was replaced with nitrogen gas to give a liquid product (yield: 757 g). A molecular weight of the product was measured with gel chromatography using tetrahydrofuran as an eluent. The number average molecular weight was 1,500 and the weight average molecular weight was 2,300 based on polystyrene. A measured proton NMR of the product was $CF_3CF_2CH_2O/CH_3O=0.12$.

PREPARATION EXAMPLE 10

A 2-liter four neck flask made of glass and equipped with a stirrer, rectification column, dropping funnel and thermometer was charged with 500 g of Methyl Silicate 51 (methyl silicate tetramer available from Colcoat Co., Ltd.) and 1.10 g of triethylamine, followed by heating to 80° C. with stirring sufficiently. Thereto was added dropwise a mixture of 950 g of 2,2,3,3,3-pentafluoropropanol and 100 g of water over one hour, followed by heating and refluxing for one hour with stirring. Then the obtained mixture was heated to 120° C. to distill off volatile components. Lastly a pressure inside the flask was reduced and the atmosphere inside the flask was replaced with nitrogen gas, and thus a product was obtained (yield: 733 g). A molecular weight of the product was measured with gel chromatography using tetrahydrofuran as an eluent. The number average molecular weight was 1,600 and the weight average molecular weight was 3,800 based on polystyrene. A measured proton NMR of the product was $CF_3CF_2CH_2O/CH_3O=0.31$.

PREPARATION EXAMPLE 11

A 2-liter four neck flask made of glass and equipped with a stirrer, rectification column, dropping funnel and thermometer was charged with 250 g of Methyl Silicate 51 (methyl silicate tetramer available from Colcoat Co., Ltd.), 250 g of X-12-641 (a silane coupling agent having a polyethylene oxide group and being available from Shin-Etsu Kagaku Kabushiki Kaisha, $CH_3O(CH_2CH_2O)_nSi(OCH_3)_3$) and 1.10 g of triethylamine, followed by heating to 80° C. with stirring sufficiently. Thereto was added dropwise a mixture of 950 g of $CF_3CF_2CH_2OH$ and 100 g of water over one hour, followed by heating and refluxing for one hour with stirring. Then the obtained mixture was heated to 120° C. to distill off volatile components. Lastly a pressure inside the flask was reduced and the atmosphere inside the flask was replaced by nitrogen gas, and thus a liquid product was obtained (yield: 743 g).

Example 1

A hundred parts of Zeffle GK-500 (hydroxyl value: 60, number average molecular weight: 12,000, butyl acetate solution, solid content: 60%) and 150 parts of butyl acetate were mixed, and thereto was added a mixture comprising 25.4 parts of Takenate D-140N (isophorone diisocyanate type curing agent containing dibutyltindilaurate) and 6 parts of $CH_3Si(OCH_2CF_2CF_3)_3$, followed by stirring sufficiently. The obtained paint composition was applied by spray coating to a AM-712-treated aluminium plate (7×15×0.5 cm) which had been coated previously with a fluororesin paint (white) as a primer (coating thickness: 50 μm), followed by drying at room temperature for one week to give a coated plate having a coating thickness of 40 μm. Then the following tests were carried out.

The above-mentioned plate was set on an exposure rack placed at an angle of 30° being faced toward southern direction on a roof of 3-storied building in Osaka Prefecture, and exposed for three months and six months. Then stainproofing property and appearance of a coating film were evaluated. Namely a difference ($_AL^*$) between an initial lightness and a lightness after the exposure was measured. The stain-proofing property of the coated plate was evaluated as "A" when $_AL^*$ is not less than 0 and less than 2; "B" when $_AL^*$ is not less than 2 and less than 4; "C" when $_AL^*$ is not less than 4 and less than 7; "D" when $_AL^*$ is not less than 7 and less than 10; and "E" when $_AL^*$ is not less than 10.

The appearance of the coated plate was checked with naked eyes and evaluated as "A" when there is no abnormalities; "B" when gloss is somewhat faded; "C" when there is an abnormality, and if evaluation is C, content of abnormality is mentioned together.

A plate coated in the same manner as above was subjected to curing at room temperature for two hours and further heated and dried at 80° C. over three hours. With respect to the resulting coated plate, the following tests were carried out.

Gloss: Specular gloss at 60° was measured according to JIS K-5400.

Pencil hardness: Measured according to JIS K-5400.

Accelerated weather resistance: I-Super UV tester (weather resistance tester available from Iwasaki Denki Kabushiki Kaisha) was used, and the weather resistance was evaluated by a specular gloss retention ratio (%) at 60° after a lapse of 1,000 hours. The test conditions are mentioned below.

(1) Light: Black panel temperature: 63° C., relative humidity: 70%, time: 11 hours, shower: 10 seconds/hour (2) Dew: Black panel temperature: 30° C., relative humidity: 100%, time: 11 hours (3) Rest: Black panel temperature: 63° C., relative humidity: 85%, time: 1 hour The results are shown in Table 1.

EXAMPLE 2

A hundred parts of Zeffle GK-500 (hydroxyl value: 60, number average molecular weight: 12,000, butyl acetate solution, solid content: 60%) and 150 parts of butyl acetate were mixed, and thereto was added a mixture comprising 25.4 parts of Takenate D-140N (isophorone diisocyanate curing agent containing dibutyltindilaurate) and 6 parts of the cooligomer obtained in Preparation Example 1, followed by stirring sufficiently. The obtained paint composition was applied by spray coating to a AM-712-treated aluminium plate (7×15×0.5 cm) which had been coated previously with a fluororesin paint (white) as a primer (coating thickness: 50 μm), followed by drying at room temperature for one week to give a coated plate having a coating thickness of 40 μm. Then the same tests as in Example 1 were carried out. The results are shown in Table 1.

EXAMPLE 3

A hundred parts of Zeffle GK-500 (hydroxyl value: 60, number average molecular weight: 12,000, butyl acetate solution, solid content: 60%) and 150 parts of butyl acetate were mixed, and thereto was added a mixture comprising 25.4 parts of Takenate D-140N (isophorone diisocyanate curing agent containing dibutyltindilaurate) and 6 parts of B(OCH$_2$CF$_2$CF$_3$)$_3$, followed by stirring sufficiently. The obtained paint composition was applied by spray coating to a AM-712-treated aluminium plate (7×15×0.5 cm) which had been coated previously with a fluororesin paint (white) as a primer (coating thickness: 50 μm), followed by drying at room temperature for one week to give a coated plate having a coating thickness of 40 μm. Then the same tests as in Example 1 were carried out. The results are shown in Table 1.

EXAMPLE 4

A hundred parts of Zeffle GK-500 (hydroxyl value: 60, number average molecular weight: 12,000, butyl acetate solution, solid content: 60%) and 150 parts of butyl acetate were mixed, and thereto was added a mixture comprising 25.4 parts of Takenate D-140N (isophorone diisocyanate curing agent containing dibutyltindilaurate) and 9 parts of the cooligomer obtained in Preparation Example 2, followed by stirring sufficiently. The obtained paint composition was applied by spray coating to a AM-712-treated aluminium plate (7×15×0.5 cm) which had been coated previously with a fluororesin paint (white) as a primer (coating thickness: 50 μm), followed by drying at room temperature for one week to give a coated plate having a coating thickness of 40 μm. Then the same tests as in Example 1 were carried out. The results are shown in Table 1.

COMPARATIVE EXAMPLE 1

A hundred parts of Zeffle GK-500 (hydroxyl value: 60, number average molecular weight: 12,000, butyl acetate solution, solid content: 60%) and 150 parts of butyl acetate were mixed, and thereto was added a mixture comprising 25.4 parts of Takenate D-140N (isophorone diisocyanate curing agent containing dibutyltindilaurate) and 18 parts of Methyl Silicate 51 (methyl silicate tetramer available from Colcoat Co., Ltd.), followed by stirring sufficiently. The obtained paint composition was applied by spray coating to a AM-712-treated aluminium plate (7×15×0.5 cm) which had been coated previously with a fluororesin paint (white) as a primer (coating thickness: 50 μm), followed by drying at room temperature for one week to give a coated plate having a coating thickness of 40 μm. Then the same tests as in Example 1 were carried out. The results are shown in Table 1.

TABLE 1

| | Stain-proofing property 3 months | Stain-proofing property 6 months | Appearance | Gloss | Pencil hardness | Accelerated weather resistance |
|---|---|---|---|---|---|---|
| Ex. 1 | B | C | A | 81 | 2H | 90 |
| Ex. 2 | A | A | A | 85 | 2H | 90 |
| Ex. 3 | B | B | A | 80 | 2H | 92 |
| Ex. 4 | A | A | A | 85 | 2H | 94 |
| Com. Ex. 1 | C | D | A | 79 | 2H | 92 |

EXAMPLE 5

To 208 g of Zeffle GK-500 (solid content: 60% by weight) were added 250 g of CR-95 (titanium oxide available from Ishihara Sangyo Kabushiki Kaisha), 100 g of butyl acetate and 800 g of glass beads, and the mixture was stirred for dispersion at 1,500 rpm for one hour with a portable grind mill (three-blade type). Then the glass beads were removed by filtration to give a dispersion of 429.4 g. To the dispersion were added 224.7 g of GK-500 and 115.4 g of butyl acetate, followed by mixing sufficiently to give a GK-500-based white paint (pigment/resin=0.833 in weight ratio). 100 Grams of the obtained white paint was mixed with a solution comprising 3.0 g of the purified product prepared in Preparation Example 3 (10 parts by weight based on 100 parts by weight of the fluorine-containing resin), 12.7 g of Takenate D-140N (NCO/OH=1) and 40 g of butyl acetate and then with 40 g of butyl acetate. The obtained paint composition was applied to a AM-7 12-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 6

100 Grams of a GK-500-based white paint (pigment/resin=0.833 in weight ratio) prepared in the same manner as in Example 5 was mixed with a solution comprising 3.0 g of the purified product prepared in Preparation Example 4 (10 parts by weight based on 100 parts by weight of the fluorine-containing resin), 12.7 g of Takenate D-140N (NCO/OH=1) and 40 g of butyl acetate and then with 40 g of butyl acetate, 0.2 g of aluminium tris(acetylacetonate) and 0.1 g of methyltris(ethylmethylketoxime)silane. The obtained paint composition was applied to a AM-7 12-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 7

100 Grams of a GK-500-based white paint (pigment/resin=0.833 in weight ratio) prepared in the same manner as in Example 5 was mixed with a solution comprising 3.0 g of the product prepared in Preparation Example 5 (10 parts by weight based on 100 parts by weight of the fluorine-containing resin), 12.7 g of Takenate D-140N (NCO/OH=1) and 40 g of butyl acetate and then with 40 g of butyl acetate and 1.0 g of 3-triethoxysilylpropylisocyanate. The obtained paint composition was applied to a AM-712-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 8

100 Grams of a GK-500-based white paint (500/500=7/3 in weight ratio, hydroxyl value: 60, acid value: 2.7, pigment/resin=0.833 in weight ratio) prepared in the same manner as in Example 5 was mixed with a solution comprising 15.0 g of the product prepared in Preparation Example 6 (50 parts by weight based on 100 parts by weight of the fluorine-containing resin), 5.10 g of Coronate HX (hexamethylenediisocyanate curing agent available from Nippon Polyurethane Kabushiki Kaisha) and 80 g of butyl acetate and then with 4.0 g of Methyl Silicate 51 (methyl silicate oligomer available from Colcoat Co., Ltd.), 0.2 g of aluminium tris(acetylacetonate) and 0.1 g of methyltris(ethylmethylketoxime)silane. The obtained paint composition was applied to a AM-7 12-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 9

100 Grams of a GK-500-based white paint (pigment/resin=0.833 in weight ratio) prepared in the same manner as in Example 5 was mixed with a solution comprising 3.0 g of the product produced in Preparation Example 7 (10 parts by weight based on 100 parts by weight of the fluorine-containing resin), 12.7 g of Takenate A 140N (NCO/OH=1) and 40 g of butyl acetate and then with 40 g of butyl acetate and 1.0 g of 3-triethoxysilylpropylisocyanate. The obtained paint composition was applied to a AM-712-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 10

A butyl acetate solution (solid content: 60%) of a copolymer (number average molecular weight: 3,000, weight average molecular weight: 8,000, hydroxyl value: 93, acid value: 4.6) composed of 46% by mole of tetrafluoroethylene, 12% by mole of vinyl pivalate, 8% by mole of vinyl benzoate, 20% by mole of hydroxybutyl vinyl ether, 1% by mole of crotonic acid and 13% by mole of vinyl versatate (VeOVa-9) was prepared. To 208 g of the butyl acetate solution of the copolymer (hereinafter referred to as "GK-HS") were added 250 g of CR-95 (titanium oxide available from Ishihara Sangyo Kabushiki Kaisha), 100 g of butyl acetate and 800 g of glass beads, followed by stirring for dispersion at 1,500 rpm over one hour with a portable grind mill (three-blade type). Then the glass beads were removed through filtration to give a dispersion of 451.2 g. To the dispersion were added 236.1 g of GK-HS and 121.3 g of butyl acetate, followed by mixing sufficiently (pigment/resin=0.833 in weight ratio) (hereinafter referred to as "GK-HS-based white paint"). Then to 100 g of the GK-HS-based white paint were added 3.0 g of a purified product produced in the same manner as in Preparation Example 3 (10 parts by weight based on 100 parts by weight of the fluorine-containing resin), 19.7 g of Takenate D-140N (NCO/OH=1) and 20 g of butyl acetate, followed by mixing sufficiently. The obtained paint composition was applied to a AM-712-treated aluminium plate (7×15×0.5 cm) by spray coating, followed by curing and drying at room temperature for one week to give a coated plate having a coating thickness of about 40 μm. Then the same tests as in Example 1 were carried out. The results are shown in Table 2.

EXAMPLE 11

A butyl acetate solution (solid content: 60%) of a fluoroolefin copolymer having a number average molecular weight Mn of 8,000, weight average molecular weight of 23,000 and acid value of 63 (mg/KOH) and composed of 47% by mole of tetrafluoroethylene, 12% by mole of vinyl versatate (VeOVa-9), 20% by mole of pivalic acid, 6% by mole of vinyl benzoate and 15% by mole of 3-(2-allyloxyethoxycarbonyl)propionic acid, was prepared. To 100 g of the butyl acetate solution of the fluoroolefin copolymer were added 16.3 g of Denacol EX-301 (triglycidyltris(2-hydroxyethyl) isocyanurate available from Nagase Kasei Kogyo Kabushiki Kaisha), 0.3 g of tetrabutylammonium bromide, 1.5 g of Tinuvin-900 (benzotriazole type ultraviolet ray absorber available from Ciba Geigy Co., Ltd.), 0.5 g of Sanol LS-765 (HALS available from Sankyo Kabushiki Kaisha) and 6.0 g of a purified product produced in the same manner as in Preparation Example 3 (10 parts by weight based on 100 parts by weight of the fluorine-containing resin). The mixture was then mixed sufficiently and thereto was added xylene to dilute the mixture to a viscosity suitable for coating. The obtained paint was spray-coated on a AM-712-treated aluminium plate (7×15×0.5 cm) which had been coated with a fluorine-containing white paint as a primer, and then the coated plate was subjected to baking at 140° C. for 30 minutes to give a total coating thickness of about 70 μm. Then the same tests as in Example 1 were carried out. The results are shown in Table 2.

EXAMPLE 12

A white paint (pigment/resin=0.833, solid content: 55%, xylene solution) of an acrylic polyol (number average molecular weight: 8,000, weight average molecular weight: 21,500) composed of 30% by mole of methyl methacrylate, 30% by mole of isobutyl methacrylate, 26% by mole of n-butyl methacrylate, 1% by mole of methacrylic acid and 13% by mole of hydroxyethyl methacrylate, was prepared. To 10 g of the white paint was admixed sufficiently 90 g of a GK-500-based white paint prepared in the same manner as in Example 5. Thereto were added 3.0 g of a purified product produced in the same manner as in Preparation Example 3 (10 parts by weight based on 100 parts by weight of the resin), 12.7 g of Takenate D-140N (NCO/OH=1) and 60 g of butyl acetate, followed by mixing sufficiently. The obtained paint composition was applied to a AM-7 12-treated aluminium plate (7×15×0.5 cm) by spray coating, followed by curing and drying at room temperature for one week to give a coated plate having a coating thickness of about 40 pm. Then the same tests as in Example 1 were carried out. The results are shown in Table 2.

EXAMPLE 13

A white paint (pigment/resin=0.833, solid content 55%, butyl acetate solution) of a blended resin (weight ratio: 70/30) containing a vinylidene fluoride copolymer (number average molecular weight: 28,000, weight average molecular weight: 70,000) composed of 74% by mole of vinylidene fluoride, 14.5% by mole of tetrafluoroethylene and 11.5% by mole of chlorotrifluoroethylene and polymethyl methacrylate (number average molecular weight: 7,500, weight average molecular weight: 19,000), was prepared. To 100 g of the white paint were added 3.0 g of a purified product produced in the same manner as in Preparation Example 3 (10 parts by weight based on 100 parts by weight of the resin) and 60 g of butyl acetate, followed by mixing sufficiently. The obtained paint composition was spray-coated, cured and dried at room temperature for one week to give a coated plate having a coating thickness of about 40 μm. Then the same tests as in Example 1 were carried out. The results are shown in Table 2.

EXAMPLE 14

A white paint (pigment/resin=0.833, solid content 55%, butyl acetate solution) of a blended resin (weight ratio: 30/70) of a vinylidene fluoride copolymer (number average molecular weight: 28,000, weight average molecular weight: 70,000) composed of 74% by mole of vinylidene fluoride, 14.5% by mole of tetrafluoroethylene and 11.5% by mole of chlorotrifluoroethylene and acrylic polyol (number average molecular weight: 7,000, weight average molecular weight: 18,000) composed of 50% by mole of methyl methacrylate, 10% by mole of isobutyl methacrylate, 29% by mole of t-butyl methacrylate, 1% by mole of methacrylic acid and 10% by mole of hydroxyethyl methacrylate, was prepared. To 100 g of the white paint were added 3.0 g of a purified product produced in the same manner as in Preparation Example 3 (10 parts by weight based on 100 parts by weight of the resin), 3.1 g of Coronate HX and 60 g of butyl acetate, followed by mixing sufficiently. The obtained paint composition was spray-coated on a AM-712-treated aluminium plate (7×15× 0.5 cm), cured and dried at room temperature for one week to give a coated plate having a coating thickness of about 40 $\mu$m. Then the same tests as in Example 1 were carried out. The results are shown in Table 2.

EXAMPLE 15

To 100 g of the GK-500-based white paint prepared in the same manner as in Example 5 were added 3.0 g of a purified product produced in the same manner as in Preparation Example 3 (10 parts by weight on the basis of 100 parts by weight of the resin), 0.3 g of SH3771 (polyethylene oxide-modified silicone available from Toray Dow Corning Silicone Kabushiki Kaisha), 19.0 g of Duranate __E405-80T (elastic curing agent available from Asahi Kasei Kogyo Kabushiki Kaisha) (NCO/OH=1) and 60 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 $\mu$m. Then the same tests as in Example 1 were carried out. The results are shown in Table 2.

EXAMPLE 16

To 100 g of the GK-500-based white paint prepared in the same manner as in Example 5 were added 3.0 g of a purified product produced in the same manner as in Preparation Example 3 (10 parts by weight on the basis of 100 parts by weight of the resin), 3.3 g of 3-trimethoxysilylpropylisocyanate, 6.4 g of Takenate Dm140N, 3.0 g of Methyl Silicate 51 (methyl silicate oligomer available from Colcoat Co., Ltd.) and 60 g of butyl acetate, followed by mixing sufficiently. The obtained paint composition was applied to a AM-712-treated aluminium plate (7×15×0.5 cm) by spray coating, dried and cured at room temperature for one week to give a coated plate having a coating thickness of about 40 $\mu$m. Then the same tests as in Example 1 were carried out. The results are shown in Table 2.

EXAMPLE 17

A white paint (pigment/resin 0.833, solid content: 55%, butyl acetate solution) of a fluorine-containing silicone copolymer (number average molecular weight: 8,000, weight average molecular weight: 21,000) composed of 46% by mole of tetrafluoroethylene, 14% by mole of vinyl versatate (VeOVa-9), 22% by mole of vinyl pivalate, 8% by mole of vinyl benzoate and 10% by mole of vinyltrimethoxysilane, was prepared. To 100 g of the white paint were added 3.0 g of a purified product produced in the same manner as in Preparation Example 3 (10 parts by weight on the basis of 100 parts by weight of the resin), 1 g of 1% solution of dibutyltindilaurate in butyl acetate and 60 g of butyl acetate, followed by mixing sufficiently. The obtained paint composition was spray-coated on a AM-712-treated aluminium plate (7×15×0.5 cm), dried and cured at room temperature for one week to give a coated plate having a coating thickness of about 40 gm. Then the same tests as in Example 1 were carried out. The results are shown in Table 2.

EXAMPLE 18

A two-liter four neck glass flask was charged with 400 g of xylene, followed by replacing with nitrogen gas and heating to 110° C. Thereto was added dropwise a mixture comprising 100 g of γ-methacryloxypropyltrimethoxysilane, 300 g of methyl methacrylate, 490 g of n-butyl methacrylate, 100 g of n-butyl acrylate, 10 g of acrylamide, 180 g of xylene and 10 g of 2,2'-azobisisobutyronitrile over five hours through a dropping funnel with stirring. Then after the dropwise addition, 5 g of 2,2'-azobisisobutyronitrile and 80 g of toluene were added dropwise over one hour, followed by refluxing at 110° C. for two hours. Thereto was added xylene to give an acrylic silicon resin solution having a solid content of 50%. A number average molecular weight of the resin was 13,500 and a weight average molecular weight was 33,000. A white paint (pigment/resin=0.833, solid content: 55%, butyl acetate solution) was prepared in the same manner as in Example 5. To 100 g of the white paint were added 1.5 g of a purified product produced in the same manner as in Preparation Example 3 (5 parts by weight on the basis of 100 parts by weight of the resin), 0.16 g of a previously prepared mixture of 2-ethylhexanoic acid and dodecylamine (weight ratio: 1/1), 0.4 g of a reaction product of an epoxy resin (Epikote 828 (bisphenol A resin available from Yuka Shell Epoxy Kabushiki Kaisha)) and Gr -aminopropyltrimethoxysilane (weight ratio: 1/1) and 60 g of butyl acetate, followed by mixing sufficiently. The obtained paint composition was spray-coated on a AM-712-treated aluminium plate (7×15×0.5 cm), dried and cured at room temperature for one week to give a coated plate having a coating thickness of about 40 $\mu$m. Then the same tests as in Example 1 were carried out. The results are shown in Table 2.

EXAMPLE 19

A coated plate was obtained in the same manner as in Example 18 except that 0.2 g of aluminium tris (acetylacetonate) was used instead of a previously prepared mixture of 2-ethylhexanoic acid and dodecylamine (weight ratio: 1/1). The same tests as in Example 18 were carried out. The results are shown in Table 2.

EXAMPLE 20

A white paint(pigment/resin=0.833, solid content: 55%, butyl acetate solution) of an acrylic silicon resin (number average molecular weight: 3,500, weight average molecular weight: 9,100) composed of 100 parts of γ-methacryloxypropyltrimethoxysilane, 300 parts of methyl methacrylate, 90 parts of n-butyl methacrylate, 500 parts of n-butyl acrylate and 10 parts of acrylamide, was prepared. To 100 g of the white paint were added 9.0 g of a product produced in the same manner as in Preparation Example 6 (30 parts by weight based on 100 parts by weight of the resin), 3.0 g of Methyl Silicate 51, 0.16 g of a previously prepared mixture (weight ratio: 1/1) of 2-ethylhexanoic acid and dodecylamine, 0.4 g of a reaction product (weight ratio: 1/1) of an epoxy resin (Epikote 828 (bisphenol A resin available from Yuka Shell Epoxy Kabushiki Kaisha)) and γ-aminopropyltrimethoxysilane, 20 g of butyl acetate and 1 g of ethanol, followed by mixing sufficiently. The obtained paint composition was spray-coated on a AM-712-treated aluminium plate (7×15×0.5 cm), cured and dried at room temperature for one week to give a coated plate having a coating thickness of about 40 μm. The same tests as in Example 1 were carried out. The results are shown in Table 2.

EXAMPLE 21

To an inorganic material prepared by mixing 25 g of DC3037 (organopolysiloxane containing methyl and phenyl and being available from Toray Dow Corning Silicone Co., Ltd.), 15 g of SR2404 (organopolysiloxane containing methyl and being available from Toray Dow Corning Silicone Co., Ltd.), 40 g of methyltrimethoxysilane, 10 g of dimethyldimethoxysilane and 5 g of titanium tetra-n-butoxide, were added 19 g of a purified product produced in the same manner as in Preparation Example 3 (20 parts by weight based on 100 parts by weight of the inorganic material), 2.5 g of aluminium tris(acetylacetonate), 2.0 g of ethyl acetoacetate and 0.5 g of ethanol, followed by mixing sufficiently. The obtained paint composition was spray-coated on a dull-finished steel plate (0.5 mm thick, previously coated with a GK-500-based white/Takenate D-140N), cured and dried at room temperature for one week to give a coated plate having a coating thickness of about 40 μm. The same tests as in Example 1 were carried out. The results are shown in Table 2.

EXAMPLE 22

A mixture of 10 g of a GK-510-based blue paint (pigment: 5370 (phthalocyanine type organic pigment available from Dainichi Seika Kabushiki Kaisha), pigment/resin=0.1, butyl acetate solution having a solid content of 33%) and 90 g of a GK-500-based white paint prepared in the same manner as in Example 5, was prepared. Thereto were added 3.0 g of a purified product produced in the same manner as in Preparation Example 3 (10 parts by weight based on 100 parts by weight of the resin), 0.3 g of MAC-2301 (modified-silicone type macromonomer coupling agent available from Nippon Nuicar Kabushiki Kaisha), 0.5 g of Disperbyk-110 (wet type dispersing agent available from BYK Chemie Japan, Limited), 0.1 g of Paintad Q (silicone type surface modifying agent available from Dow Corning Asia, Limited), 2.0 g of Tinuvin 123 (HALS available from Ciba Geigy Co., Ltd.), 0.25 g of Bentone 27 (added being dispersed previously with toluene, Rheology control agent available from NL Chemicals Kabushiki Kaisha), 40 g of butyl acetate, 20 g of 3-methoxypropyl acetate and 12.7 g of Takenate D-140N (NCO/OH=1), followed by mixing sufficiently. The obtained paint composition was spray-coated on a AM-712-treated aluminium plate (7×15×0.5 cm), cured and dried at room temperature for one week to give a coated plate having a coating thickness of about 40 μm. The same tests as in Example 1 were carried out. The results are shown in Table 2.

EXAMPLE 23

A white paint (pigment/resin=0.833, solid content: 55%, butyl acetate solution) of an acrylic polyol (number average molecular weight: 7,000, weight average molecular weight: 19,000) composed of 10% by mole of methyl methacrylate, 15% by mole of isobutyl methacrylate, 44% by mole of n-butyl acrylate, 1% by mole of methacrylic acid, 15% by mole of hydroxyethyl methacrylate and 15% by mole of stirene, was prepared. To 100 g of the white paint were added 1.5 g of a purified product produced in the same manner as in Preparation Example 3 (5 parts by weight based on 100 parts of the resin), 7.5 g of Cymel 303 (complete alkyl type methylated melamine available from Mitsui Cyanamid Kabushiki Kaisha), 0.3 g of Catalyst 4040 (aromatic sulfonic acid type curing catalyst available from Mitsui Cyanamid Kabushiki Kaisha) and 60 g of butyl acetate, followed by mixing sufficiently. The obtained paint composition was spray-coated on a AM-712-treated aluminium plate (7×15×0.5 cm), cured and dried at 130° C. for 20 minutes to give a coated plate having a coating thickness of about 40 Im. The same tests as in Example 1 were carried out. The results are shown in Table 2.

Example 24

A coated plate was prepared in the same manner as in Example 23 except that 13.2 g of Desmodur BL-3175 (blocked HDI type isocyanate available from Sumitomo Bayer Urethane Kabushiki Kaisha) was used instead of Cymel 303 and Catalyst 4040 and that the curing was carried out at 170° C. for 20 minutes. The same tests as in Example 23 were carried out. The results are shown in Table 2.

EXAMPLE 25

To 100 g of a GK-500-based white paint prepared in the same manner as in Example 5 were added 3.0 g of a purified product produced in the same manner as in Preparation Example 8 (10 parts by weight based on 100 parts by weight of the resin), 3.3 g of 3-trimethoxysilylpropylisocyanate, 6.4 g of Takenate D-140N, 1.0 g of Ethyl Silicate 40 (ethyl silicate oligomer available from Colcoat Co., Ltd.) and 60 g of butyl acetate, followed by mixing sufficiently. The obtained paint composition were spray-coated on a AM-712-treated aluminium plate (7×15×0.5 cm), cured and dried at room temperature for one hour to give a coated plate having a coating thickness of about 40 μm. The same tests as in Example 1 were carried out. The results are shown in Table 2.

EXAMPLE 26

To 100 g of a GK-500-based white paint (pigment/resin= 0.833 in weight ratio) prepared in the same manner as in Example 5 were added a solution composed of 3.0 g of a product produced in Preparation Example 9 (10 parts by weight based on 100 parts by weight of the fluorine-containing resin), 12.7 g of Takenate D140N (NCO/OH=1) and 40 g of butyl acetate, and further 40 g of butyl acetate, 0.2 g of aluminium tris(acetylacetonate) and 1.5 g of 3-trimethoxysilylpropylisocyanate, followed by mixing. The obtained paint composition was spray-coated on a AM-712-treated aluminium plate (7×15×0.5 cm), cured and dried at room temperature for one week to give a coated plate having a coating thickness of about 40 μm. The same tests as in Example 1 were carried out. The results are shown in Table 2.

EXAMPLE 27

100 Grams of a GK-500-based white paint XM-(pigment/resin=0.833 in weight ratio) prepared in the same manner as in Example 5 was mixed with a solution composed of 3.0 g of a product prepared in Preparation Example 10 (10 parts by weight based on 100 parts by weight of the fluorine-containing resin), 12.7 g of Takenate D-140N (NCO/OH=1) and 40 g of butyl acetate, and then with 40 g of butyl acetate and 1.0 g of 3-triethoxysilylpropylisocyanate, followed by mixing. The obtained paint composition was spray-coated on a AM-712-treated aluminium plate (7×15×0.5 cm), cured and dried at room temperature for one week to give a coated plate having a coating thickness of about 40 μm. The same tests as in Example 1 were carried out. The results are shown in Table 2.

EXAMPLE 28

100 Grams of a GK-500/GK-510-based white paint (500/510=7/3 in weight ratio, hydroxyl value=60, acid value=2.7, pigment/resin=0.833 in weight ratio) prepared in the same manner as in Example 5 was mixed with a solution composed of 3.0 g of a product produced in Preparation Example 11 (10 parts by weight based on 100 parts by weight of the fluorine-containing resin), 5.10 g of Coronate HX (hexamethylenediisocyanate curing agent available from Nippon Polyurethane Kabushiki Kaisha) and 80 g of butyl acetate, and then with 3.0 g of Methyl Silicate 51 (methyl silicate oligomer available from Colcoat Co., Ltd.), 0.2 g of aluminium tris(acetylacetonate) and 0.1 g of methyltris(ethylmethylketoxime)silane. The obtained paint composition was spray-coated on a AM-712-treated aluminium plate (7×15×0.5 cm), cured and dried at room temperature for one week to give a coated plate having a coating thickness of about 40 μm. The same tests as in Example 1 were carried out. The results are shown in Table 2.

TABLE 2

| | Stain-proofing property 3 months | Stain-proofing property 6 months | Appearance | Gloss | Pencil hardness | Accelerated weather resistance |
|---|---|---|---|---|---|---|
| Ex. 5 | A | A | A | 81 | 2H | 93 |
| Ex. 6 | A | A | A | 82 | 2H | 91 |
| Ex. 7 | A | A | A | 81 | 2H | 92 |
| Ex. 8 | A | A | A | 83 | 2H | 90 |
| Ex. 9 | A | A | A | 90 | 2H | 92 |
| Ex. 10 | A | A | A | 84 | 2H | 91 |
| Ex. 11 | A | A | A | 81 | 2H | 94 |
| Ex. 12 | A | A | A | 90 | 2H | 40 |
| Ex. 13 | A | A | A | 83 | 2H | 93 |
| Ex. 14 | A | A | A | 80 | 2H | 60 |
| Ex. 15 | A | A | A | 82 | 2H | 92 |
| Ex. 16 | A | A | A | 83 | 2H | 95 |
| Ex. 17 | A | A | A | 81 | 2H | 93 |
| Ex. 18 | A | A | A | 89 | 2H | 75 |
| Ex. 19 | A | A | A | 90 | 2H | 78 |
| Ex. 20 | A | A | A | 91 | 2H | 75 |
| Ex. 21 | A | A | A | 93 | 2H | 90 |
| Ex. 22 | A | A | A | 83 | 2H | 92 |
| Ex. 23 | A | A | A | 91 | 2H | 35 |
| Ex. 24 | A | A | A | 90 | 2H | 43 |
| Ex. 25 | A | A | A | 95 | 2H | 93 |
| Ex. 26 | A | A | A | 82 | 2H | 91 |
| Ex. 27 | A | A | A | 85 | 2H | 90 |
| Ex. 28 | A | A | A | 81 | H | 85 |

Industrial Applicability

As it is clear from the above-mentioned results, the composition for paints which contains the stain-proofing agent of the present invention is excellent in stain-proofing property, curability, compatibility, recoatability, storage stability, pot life, floating resistance, antifoaming property, workability in coating, appearance, antisagging property and alkali resistance.

What is claimed is:

1. A method of stain-proofing a surface comprising applying to the surface a composition for paints which comprises (A) a stain-proofing agent comprising an oligomer of an organometallic compound represented by the formula (1) or a cooligomer comprising two or more of said organometallic compounds represented by the formula (1):

$$M(OR^1)_a \qquad (1)$$

wherein a is 3 or 4, M is Si when a is 4, and M is Al or B when a is 3,

R$^1$ are the same or different, and each is hydrogen atom, a siloxane residue or a monovalent organic group which has 1 to 1,000 carbon atoms and may contain oxygen atom, nitrogen atom, fluorine atom and/or chlorine atom; provided that said organometallic compound excludes an organometallic compound represented by the formula (2):

(2)

wherein n is an integer of 1 to 20, all of R$^{15}$ are different or at least two of R$^{15}$ are the same, each is a monovalent organic group which has 1 to 1,000 carbon atoms and may contain oxygen atom, nitrogen atom and/or silicon atom and a part or the whole of hydrogen atoms of said organic group may be substituted by fluorine atom or fluorine atom and chlorine atom; (B) a resin for paints and (C) a curing agent and/or a curing catalyst.

2. The method of stain-proofing a surface of claim 1, wherein the resin for paints is a fluoroolefin copolymer having hydroxyl group and/or carboxyl group, acrylic polyol resin, acrylic silicon resin, or homopolymer or copolymer of vinylidene fluoride having no functional group, which is solvent-soluble.

* * * * *